(12) United States Patent
Kubota et al.

(10) Patent No.: US 10,627,236 B2
(45) Date of Patent: Apr. 21, 2020

(54) POSITION MEASUREMENT APPARATUS, POSITION CORRECTION METHOD, AND POSITION INFORMATION ACQUISITION SYSTEM

(71) Applicant: SHARP KABUSHIKI KAISHA, Sakai, Osaka (JP)

(72) Inventors: Hajime Kubota, Sakai (JP); Yoshihisa Sekiguchi, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 16/282,878

(22) Filed: Feb. 22, 2019

(65) Prior Publication Data

US 2019/0265037 A1 Aug. 29, 2019

(30) Foreign Application Priority Data

Feb. 27, 2018 (JP) .................. 2018-033658
Jan. 25, 2019 (JP) .................. 2019-011270

(51) Int. Cl.
| | |
|---|---|
| G01C 21/00 | (2006.01) |
| H04W 4/02 | (2018.01) |
| G01C 21/16 | (2006.01) |
| G01C 21/14 | (2006.01) |
| G01C 22/00 | (2006.01) |
| G01S 19/49 | (2010.01) |

(52) U.S. Cl.
CPC .......... *G01C 21/005* (2013.01); *G01C 21/14* (2013.01); *G01C 22/00* (2013.01); *G01S 19/49* (2013.01); *H04W 4/026* (2013.01)

(58) Field of Classification Search
CPC ...... G01C 21/005; G01C 22/00; G01C 21/14; H04W 4/026; G01S 19/49
See application file for complete search history.

(56) References Cited

U.S. PATENT DOCUMENTS

| | | | | |
|---|---|---|---|---|
| 2002/0099481 A1* | 7/2002 | Mori | .................. | G01C 21/12 701/23 |
| 2010/0125414 A1* | 5/2010 | Okuyama | .............. | G01C 22/00 701/494 |

(Continued)

FOREIGN PATENT DOCUMENTS

| | | |
|---|---|---|
| JP | 2012-122892 A | 6/2012 |
| JP | 2012-233731 A | 11/2012 |
| WO | 2014/156385 A1 | 10/2014 |

*Primary Examiner* — Joseph E Dean, Jr.
(74) *Attorney, Agent, or Firm* — ScienBiziP, P.C.

(57) ABSTRACT

In a position measurement apparatus, to maintain accuracy of a trajectory even when the frequency of acquisition of absolute position information is reduced, a movement information generation unit generates movement information including a movement distance and a movement direction of a device of interest based on a sensor value, and a reliability generation unit generates reliability information indicating a reliability value of the movement information. An amount of distance correction and an amount of angle correction to be made every predetermined number of steps are determined based on the reliability information and the movement information, and the distance and the angle are corrected every predetermined number of steps starting from the latest already-corrected position information.

17 Claims, 17 Drawing Sheets

(56) References Cited

U.S. PATENT DOCUMENTS

2013/0338915 A1* 12/2013 Mizuochi ............... G01C 21/16
701/500
2016/0025496 A1 1/2016 Shimizu

* cited by examiner

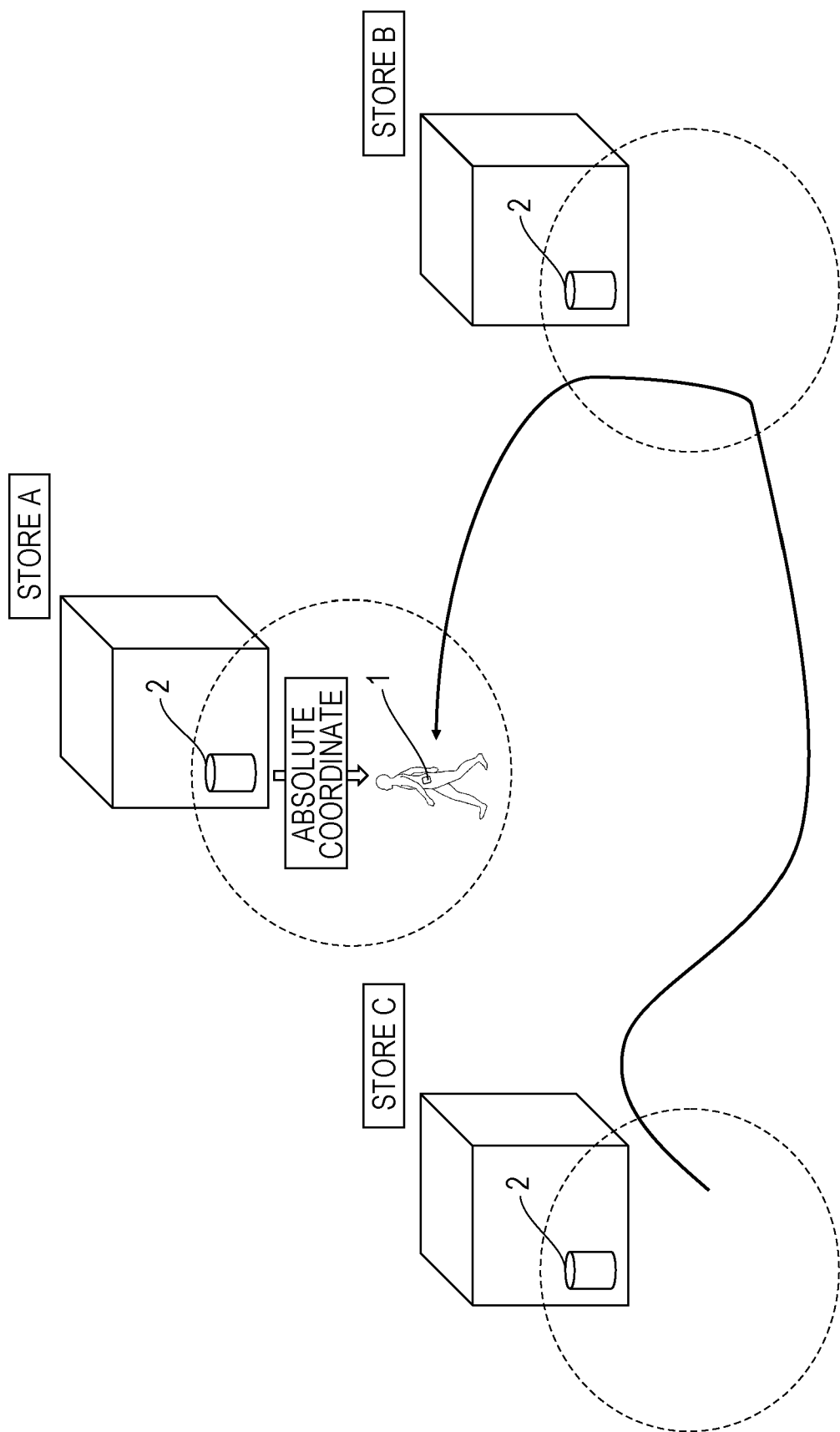

POSITION MEASUREMENT APPARATUS, POSITION CORRECTION METHOD, AND POSITION INFORMATION ACQUISITION SYSTEM

BACKGROUND

1. Field

The present disclosure relates to a position measurement apparatus, a position correction method, and a position information acquisition system.

2. Description of the Related Art

In portable terminal apparatuses such as a portable telephone or the like, a technique of measuring a position using a GPS (Global Positioning System) function is generally used. However, the position measurement using the GPS function consumes large electric power, which may result in a reduction in battery life.

In view of the above, a technique to reduce consumption power to a relatively low level has been proposed. In this proposed technique, a walking path or a moving path of the user is estimated using an autonomous navigation technique while a GPS function is intermittently executed thereby achieving a reduction in consumption power (see, for example, International Publication No. WO2014/156385 (laid open Feb. 10, 2014), Japanese Unexamined Patent Application Publication No. 2012-233731 (laid open Nov. 29, 2012)).

In order to increase estimation accuracy of a moving path while minimizing the use of the GPS function to suppress consumption power, it has been proposed to use a walking trajectory interpolation technique using a spring model (see, for example, Japanese Unexamined Patent Application Publication No. 2012-122892 (laid open Jun. 28, 2012)).

A rotation and/or enlargement/reduction are generally performed to correct a moving path estimated by the autonomous navigation using absolute position information acquired by the GPS function. However, operating the GPS function intermittently to reduce the consumption power may make it difficult to achieve high-enough accuracy in correction according to a known related technique.

The present disclosure provides a technique of achieving a high trajectory accuracy even when the frequency of acquisition of absolute position information is reduced.

SUMMARY

In an aspect of the present disclosure, a position measurement apparatus includes a position estimation unit configured to estimate a position of a device of interest based on a sensor value acquired from a sensor, an absolute coordinate measurement unit configured to measure absolute coordinates of the device of interest, and a correction processing unit configured to correct the position of the device of interest estimated by the position estimation unit based on the absolute coordinates of the device of interest measured by the absolute coordinate measurement unit, the position estimation unit including an attitude information generation unit configured to generate attitude information associated with the device of interest based on the sensor value, a movement information generation unit configured to generate, based on the attitude information, movement information including a movement distance of the device of interest and a movement direction of the device of interest, and a reliability generation unit configured to generate, based on the sensor value, reliability information indicating a reliability value of the movement information, the correction processing unit being configured to determine a distance correction amount every predetermined number of steps and an angle correction amount every predetermined number of steps based on the reliability information and the movement information, and correct the movement distance and the movement direction every predetermine number of steps starting from latest already-corrected position information associated with the device of interest.

In an aspect of the present disclosure, a position correction method includes estimating a position of a device of interest based on a sensor value acquired by a sensor, measuring absolute coordinates of the device of interest; and, correcting the estimated position of the device of interest based on the absolute coordinates of the device of interest, the estimating of the position including generating attitude information associated with the device of interest based on the sensor value, generating movement information including a movement distance of the device of interest and a movement direction of the device of interest based on the attitude information, and generating reliability information indicating a reliability value of the movement information based on the sensor value, the correction processing unit being configured to determine, based on the reliability information and the movement information, an amount of distance correction to be made every predetermined number of steps and an amount of angle correction to be made every predetermined number of steps, and correcting the movement distance and the movement direction every predetermine number of steps starting from latest already-corrected position information associated with the device of interest.

BRIEF DESCRIPTION OF THE DRAWINGS

FIG. 21 is a diagram illustrating an example of a position information acquisition system according to an embodiment of the present disclosure.

DESCRIPTION OF THE EMBODIMENTS

First Embodiment

A position measurement apparatus 1 according to a first embodiment of the present disclosure is described in detail below. The position measurement apparatus 1 is an apparatus configured to measure a position of a device of interest capable of being carried by a user such as a portable navigation apparatus, a smartphone, or the like, thereby maintaining high accuracy of a trajectory of a moving path dependent on a movement of the user.

Note that in the following description, it is assumed by way of example that the position measurement apparatus 1 is installed integrally with the device of interest whose position is to be measured, that is, the device of interest itself is the position measurement apparatus 1. However, the manner of installing the position measurement apparatus 1 is not limited to this example, but the position measurement apparatus 1 may be installed, for example, on a server that receives a sensor value from a sensor disposed on the device of interest and the position measurement apparatus 1 may transmit information associated with the measured position of the device of interest to the device of interest.

Figure 2:
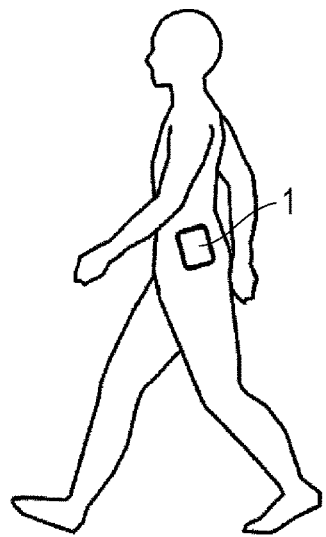
FIG. 2 is a diagram illustrating an example of a manner in which a position measurement apparatus is worn according to a first embodiment of the present disclosure.

FIG. 2 is a diagram illustrating an example of a manner in which the position measurement apparatus 1 is worn. In the configuration in which the position measurement apparatus 1 is installed integrally with the device of interest whose position is to be measured, the position measurement apparatus 1 may be worn on a waist or the like of the user such that the position measurement apparatus 1 is located higher than the user's groin as shown in FIG. 2. The position measurement apparatus 1 acquires information associated with the attitude of the position measurement apparatus 1 depending on the movement of the user and measure the position of the position measurement apparatus 1.

Outline of Configuration of Position Measurement Apparatus 1

Figure 1:
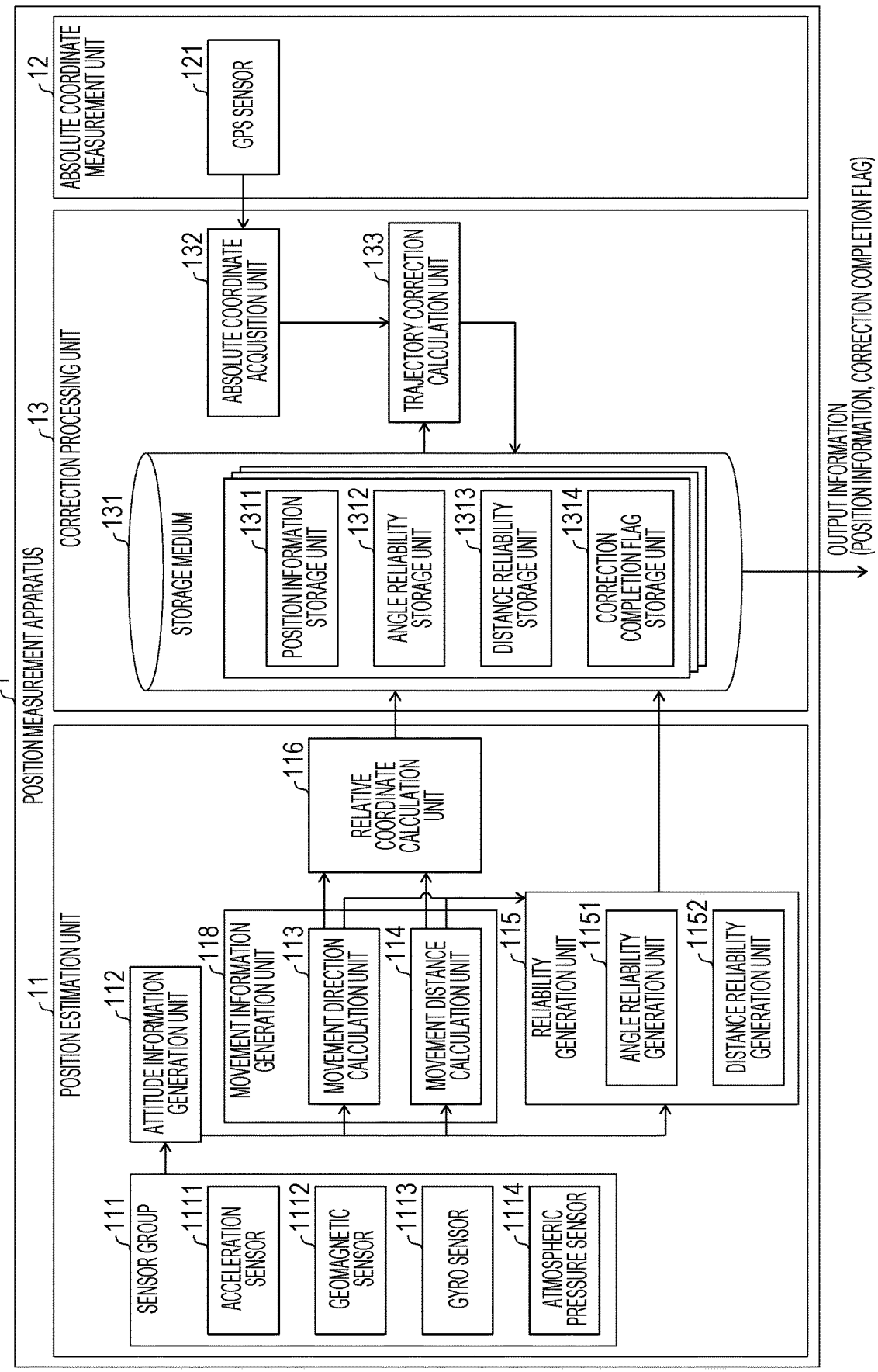
FIG. 1 is a block diagram schematically illustrating an example of a configuration of a position measurement apparatus according to a first embodiment of the present disclosure.

FIG. 1 is a block diagram schematically illustrating an example of a configuration of the position measurement apparatus 1 according to the first embodiment.

The position measurement apparatus 1 includes a position estimation unit 11, an absolute coordinate measurement unit 12, and a correction processing unit 13.

Configuration of Position Estimation Unit 11

The position estimation unit 11 includes a sensor group 111 including a plurality of sensors, and has a function of estimating the position of the position measurement apparatus 1 by using, for example, an autonomous navigation technique. The position estimation unit 11 estimates the position of the position measurement apparatus 1 based on sensor values acquired by the respective sensors in the sensor group 111.

The sensor group 111 includes an acceleration sensor 1111, a geomagnetic sensor 1112, a gyro sensor 1113, and an atmospheric pressure sensor 1114.

The acceleration sensor 1111 is influenced by an acceleration of gravity. That is, even in a non-operating state, the vertical components of the sensor values of the acceleration sensor 1111 are influenced by the acceleration of gravity. Using this fact, the position estimation unit 11 is capable of determining the wearing attitude of the position measurement apparatus 1 based on sensor values acquired by the acceleration sensor 1111.

The sensor values acquired by the acceleration sensor 1111 vary depending on a movement of the user. By integrating the sensor values acquired by the acceleration sensor 1111, it is possible to obtain information associated with the velocity of the moving of the position measurement apparatus 1. By further integrating the integrated values of the sensor values acquired by the acceleration sensor 1111, it is possible to obtain information associated with the movement distance of the position measurement apparatus 1.

The geomagnetic sensor 1112 is a sensor configured to measure a magnetic flux density. The position estimation unit 11 is capable of determining a magnetic north direction based on the sensor values acquired by the geomagnetic sensor 1112. Note that it is known that when an object that generates a magnetic field exists near the geomagnetic sensor 1112, the geomagnetic sensor 1112 is influenced by this magnetic field.

The gyro sensor 1113 is a sensor configured to measure an angular velocity that occurs in a rotational movement. The position estimation unit 11 is capable of obtaining a rotation angle by integrating the sensor value of the gyro sensor 1113 that occurs in a rotational movement. Furthermore, by setting an initial direction (an initial angle) in the gyro sensor 1113 in a state in which there is no rotational movement, it becomes possible to detect the magnetic north direction, and to acquire a rotation angle with respect to the magnetic north direction based on the sensor values acquired from the gyro sensor 1113.

The atmospheric pressure sensor 1114 is a sensor configured to measure an atmospheric pressure in an ambient environment. Based on the sensor value acquired by the atmospheric pressure sensor 1114, the position estimation unit 11 is capable of calculating a movement distance of the position measurement apparatus 1 in the vertical direction, using the fact that the atmospheric pressure varies depending on a change in the height. Note that it is known that a change in a sensor value of the atmospheric pressure sensor 1114 can occur when a change occurs in an environment such as weather or when the atmospheric pressure sensor 1114 enters or exits a closed space.

The position estimation unit 11 further includes an attitude information generation unit 112 configured to generate attitude information associated with the position measurement apparatus 1 based on the sensor values detected by the respective sensors 1111, 1112, 1113, and 1114 of the sensor group 111. The position estimation unit 11 also includes a movement information generation unit 118 configured to generate movement information including a movement distance and a movement direction of the position measurement apparatus 1 based on the attitude information generated by the attitude information generation unit 112. The position estimation unit 11 also includes a reliability generation unit 115 configured to generate reliability information indicating a reliability value of the movement information generated by the movement information generation unit 118 based on the sensor values detected by the respective sensors 1111, 1112, 1113, and 1114 of the sensor group 111 and the attitude information generated by the attitude information generation unit 112. The position estimation unit 11 also includes a relative coordinate calculation unit 116 configured to calculate a relative position of the position measurement apparatus 1 in latitude and longitude based on the movement information generated by the movement information generation unit 118.

The attitude information generation unit 112 generates attitude information associated with the position measurement apparatus 1 based on at least one of the sensor values detected by the acceleration sensor 1111, the geomagnetic sensor 1112, and the gyro sensor 1113.

Figure 3:
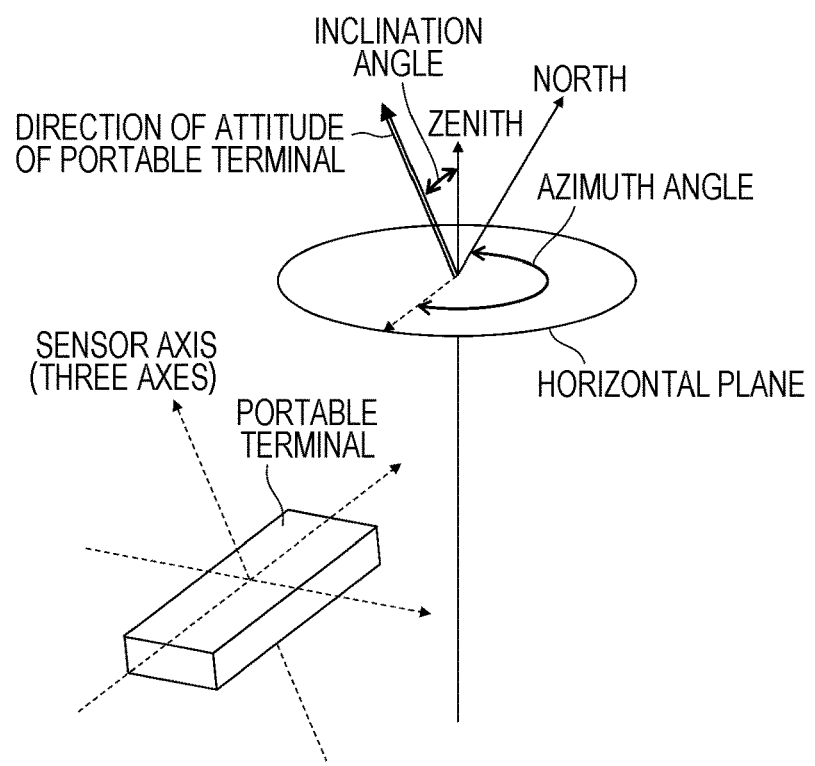
FIG. 3 is a diagram illustrating an inclination angle and an azimuth angle used in calculating an attitude according to the first embodiment of the present disclosure.

FIG. 3 is a diagram illustrating a relationship between the attitude of the position measurement apparatus 1 and the inclination angle and azimuth angle representing the attitude. For example, as illustrated in FIG. 3, the attitude information generation unit 112 calculates the inclination angle of the attitude of the position measurement apparatus 1 with respect to a direction from the zenith based on the sensor value of the acceleration sensor 1111. Furthermore, the position measurement apparatus 1 calculates the azimuth angle, which is an angle about an axis defined in the zenith direction based on the sensor value of the gyro sensor 1113 in which the initial angle is set, and the sensor value of the geomagnetic sensor 1112.

The attitude information generation unit 112 is capable of generating attitude information indicating the attitude of the position measurement apparatus 1 indicated by the inclination angle with respect to the zenith direction and the azimuth angle based on the sensor values of the acceleration sensor 1111 the geomagnetic sensor 1112, and the gyro sensor 1113, even when the position measurement apparatus 1 is in any attitude.

The gyro sensor 1113 and the geomagnetic sensor 1112 each have a sensor-specific offset value. Furthermore, there is a possibility that the geomagnetic sensor 1112 is influenced by a magnetic field as described above. The attitude information generation unit 112 calculates the attitude of the position measurement apparatus 1 from the sensor value acquired by the acceleration sensor 1111 and the sensor value acquired by the geomagnetic sensor 1112. The attitude information generation unit 112 also calculates the attitude of the position measurement apparatus 1 using the sensor value of the gyro sensor 1113. The attitude information generation unit 112 selects one attitude from the two calculated attitudes by using a Kalman filter or the like thereby obtaining a single most likelihood angle.

The attitude information generation unit 112 performs an affine transformation on the inclination angle from the zenith direction and the azimuth angle of the position measurement apparatus 1 thereby performing a coordinate axis transformation on the calculated attitude from the sensor axis coordinate system to the absolute coordinate system and generating attitude information. The attitude information generation unit 112 provides the generated attitude information to the movement information generation unit 118 and the reliability generation unit 115.

The movement information generation unit 118 includes a movement direction calculation unit 113 configured to calculate the movement direction of the position measurement apparatus 1, and a movement distance calculation unit 114 configured to calculate the movement distance of the position measurement apparatus 1.

The movement direction calculation unit 113 performs a principal component analysis on the horizontal acceleration included in the attitude information generated by the attitude information generation unit 112, thereby generating information indicating the movement direction given by the first principal component. In general, when an object moves, the acceleration changes only in its movement direction. However, when a human being walks, he/she moves left and right feet alternately and thus his/her body sways to the left and right. As a result, the acceleration also changes in a direction different from the traveling direction. However, the change in the acceleration in the traveling direction is greater than in a direction difference from the traveling direction. Therefore, by performing the principal component analysis on the horizontal acceleration, it is possible to determining the actual (principal) movement direction. The movement direction calculation unit 113 provides the information associated with the movement direction to the relative coordinate calculation unit 116.

On the other hand, in the case of an unusual walking manner, for example, in which the body sways largely to the left and right, the error in the determination of the movement direction tends to become large, which may cause a reduction in accuracy of the movement trajectory. To handle the above situation, in the present embodiment, the information associated with the movement direction calculated by the movement direction calculation unit 113 is provided to the reliability generation unit 115, which generates the reliability information indicating the reliability value of the information associated with the movement direction.

The movement distance calculation unit 114 calculates the length of stride of the user by using the change in the acceleration in the vertical direction included in the attitude information generated by the attitude information generation unit 112 thereby acquiring the movement distance of the user every walking step. Note that alternatively the movement distance calculation unit 114 may calculate the movement distance from the acceleration information by any known technique. The movement distance calculation unit 114 provides the information associated with the calculated movement distance to the relative coordinate calculation unit 116 and the reliability generation unit 115.

Figure 4:
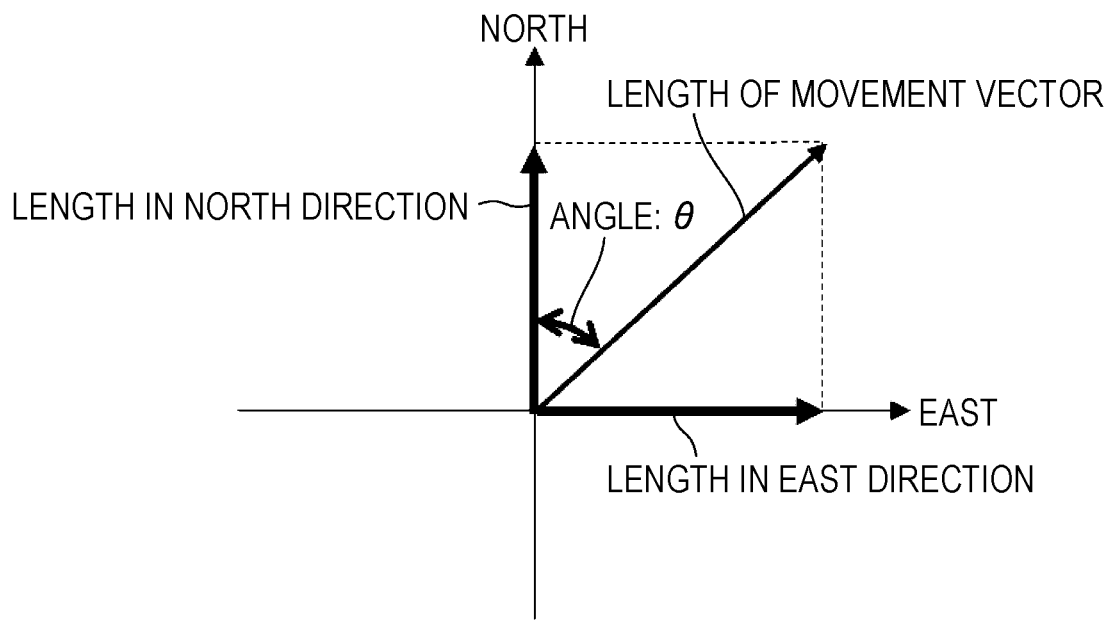
FIG. 4 is a diagram illustrating a movement vector used by a relative coordinate calculation unit according to the first embodiment of the present disclosure.

The relative coordinate calculation unit 116 calculates the relative position of the position measurement apparatus 1 based on a movement vector represented by the movement information including the movement direction and the movement distance respectively calculated by the movement direction calculation unit 113 and the movement distance calculation unit 114. FIG. 4 is a diagram illustrating a movement vector used by the relative coordinate calculation unit 116. As illustrated in FIG. 4, the relative coordinate calculation unit 116 decomposes the movement vector into vectors respectively pointing north and east, and determines the latitude and longitude according to a known formula (see, for example, at a web site of Geographical Survey Institute (http://www.gsi.go.jp/index.html)). The relative coordinate calculation unit 116 provides the calculated relative position of the position measurement apparatus 1 to the correction processing unit 13.

Reliability Generation Unit 115

The reliability generation unit 115 generates reliability information indicating the reliability value of the attitude information and the reliability value of the movement information based on the attitude information generated by the attitude information generation unit 112 and the movement information generated by the movement information generation unit 118. The reliability value is calculated, for example, from an error caused by an environment in which the sensor values of the respective sensors 1111, 1112, 1113, and 1114 of the sensor group 111, or an error that occurs when the attitude information and the movement information are calculated based on the sensor values described above.

The reliability generation unit 115 estimates the angle reliability value indicating a degree of an error of the angle which occurs in the calculated direction in which the user moves in every walking step, and estimates the distance reliability value indicating a degree of an error of the distance which occurs in the calculated distance of the movement of the user in each walking step. The reliability generation unit 115 estimates the reliability values in terms of the angle made by the user in every walking step and the distance moved by the user in every walking step. Note that the reliability values are used later in a trajectory correction. This makes it possible to correct a local trajectory. Note that the distance moved by the user every walking step is equal to the length of stride of the user. In the following description, the length of stride corresponds to the distance moved by the user every walking step.

Furthermore, in the following description, it is assumed by way of example that the reliability generation unit 115 estimates the angle reliability value every walking step of the user and the distance reliability value every walking step of the user. However, instead of estimating the reliability value every walking step, the reliability generation unit 115 may estimate the angle reliability value every predetermined number of steps and the distance reliability value every predetermined number of steps.

The reliability generation unit 115 includes an angle reliability generation unit 1151 and a distance reliability generation unit 1152.

The angle reliability generation unit 1151 generates an angle reliability value based on the attitude information generated by the attitude information generation unit 112 and the information associated with the movement direction every walking step of the user calculated by the movement direction calculation unit 113.

The angle reliability generation unit 1151 generates the angle reliability value of the attitude information by determining the difference in azimuth angle between attitude information generated based on a combination of the sensor value of the acceleration sensor 1111 and the sensor value of the geomagnetic sensor 1112 from the attitude information generated based on the sensor value of the gyro sensor 1113. For example, the angle reliability generation unit 1151 may determine the angle reliability value of the attitude information as 1/|degG−degM| where degG is the azimuth angle calculated based on the sensor value of the gyro sensor 1113 and degM is the azimuth angle calculated based on the sensor value of the geomagnetic sensor 1112.

Figure 5:
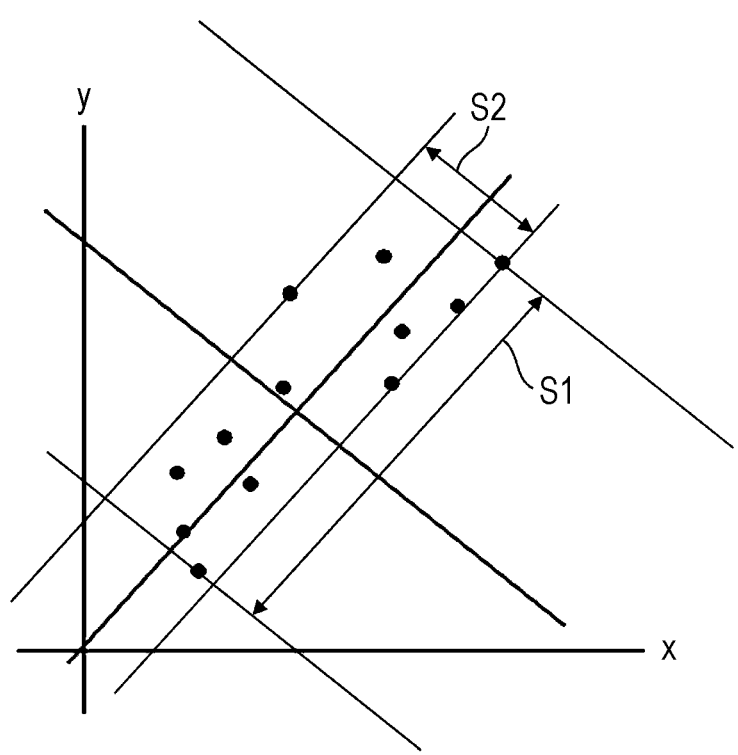
FIG. 5 is a diagram illustrating the magnitude of each component of principal component analysis used by a reliability generation unit in calculating angle reliability value according to the first embodiment of the present disclosure.

FIG. 5 is a diagram illustrating the magnitude of each component of the horizontal acceleration for use in generating the angle reliability value. The angle reliability generation unit 1151 generates the angle reliability value in the movement direction every walking step of the user by using the ratio of the second principal component to the first principal component of the horizontal acceleration calculated by the movement direction calculation unit 113. For example, the angle reliability generation unit 1151 may determine the angle reliability value in the movement direction every walking step of the user as S1/S2 where S1 is the magnitude of the first principal component of the horizontal acceleration and S2 is the magnitude of the second principal component as illustrated in FIG. 5.

The angle reliability generation unit 1151 generates the angle reliability value of the position information associated with the user based on the angle reliability value of the attitude information and the angle reliability value in the movement direction every walking step of the user. The angle reliability generation unit 1151 determines the angle reliability value $\alpha$ in the position information associated with the user as $\alpha=(\alpha_A*\alpha_B)/(\alpha_A+\alpha_B)$ where $\alpha_A$ is the angle reliability value of the attitude information and $\alpha_B$ is the angle reliability value in the movement direction every walking step of the user.

The distance reliability generation unit 1152 generates the distance reliability value based on the information associated with the movement distance moved by the user every walking step calculated by the movement distance calculation unit 114.

The distance reliability generation unit 1152 generates the distance reliability value of the movement distance made by the user every walking step by calculating the difference between the vertical movement distance calculated based on the sensor value of the atmospheric pressure sensor 1114 and the movement distance in the vertical direction calculated based on the sensor value of the acceleration sensor 1111.

For example, the distance reliability generation unit 1152 determines the distance La in the vertical direction that occurs each time the user walks one step from the vertical acceleration calculated by the movement distance calculation unit 114. Furthermore, the distance reliability generation unit 1152 determines the amount of change Lp in the distance from the amount of change in atmospheric pressure acquired based on the sensor value of the atmospheric pressure sensor 1114. The distance reliability generation unit 1152 then determines the distance reliability value as 1/|La−Lp|.

The angle reliability generation unit 1151 and the distance reliability generation unit 1152 respectively provides the angle reliability value and the distance reliability value, which are reliability information indicating the reliability value of the movement information, to the correction processing unit 13.

In the present embodiment, two kinds of reliability values, that is, the angle reliability value generated by the angle reliability generation unit 1151 and the distance reliability value generated by the distance reliability generation unit 1152 are used by way of example but not limitation. For example, only one of the angle reliability value and the distance reliability value may be used. In this case, an unused reliability value may be fixed to 1, and only the other reliability value may be used.

In a case where the value of the distance reliability value is fixed to 1, a local distance correction every walking step of the user may not be performed, but a global correction may be performed uniformly on the whole trajectory, and a local correction on the angle may be performed every one step of the user.

Configuration of Absolute Coordinate Measurement Unit 12

The absolute coordinate measurement unit 12 includes a GPS sensor 121 configured to receive a GPS signal, and determines a current position of the position measurement apparatus 1 from the signal received via the GPS sensor 121. Thus, by acquiring the GPS signal via the GPS sensor 121, the absolute coordinate measurement unit 12 measures absolute coordinates that indicate the current position of the position measurement apparatus 1 in latitude and longitude. The absolute coordinate measurement unit 12 provides the measured absolute coordinates of the position measurement apparatus 1 to the correction processing unit 13.

Figure 17:
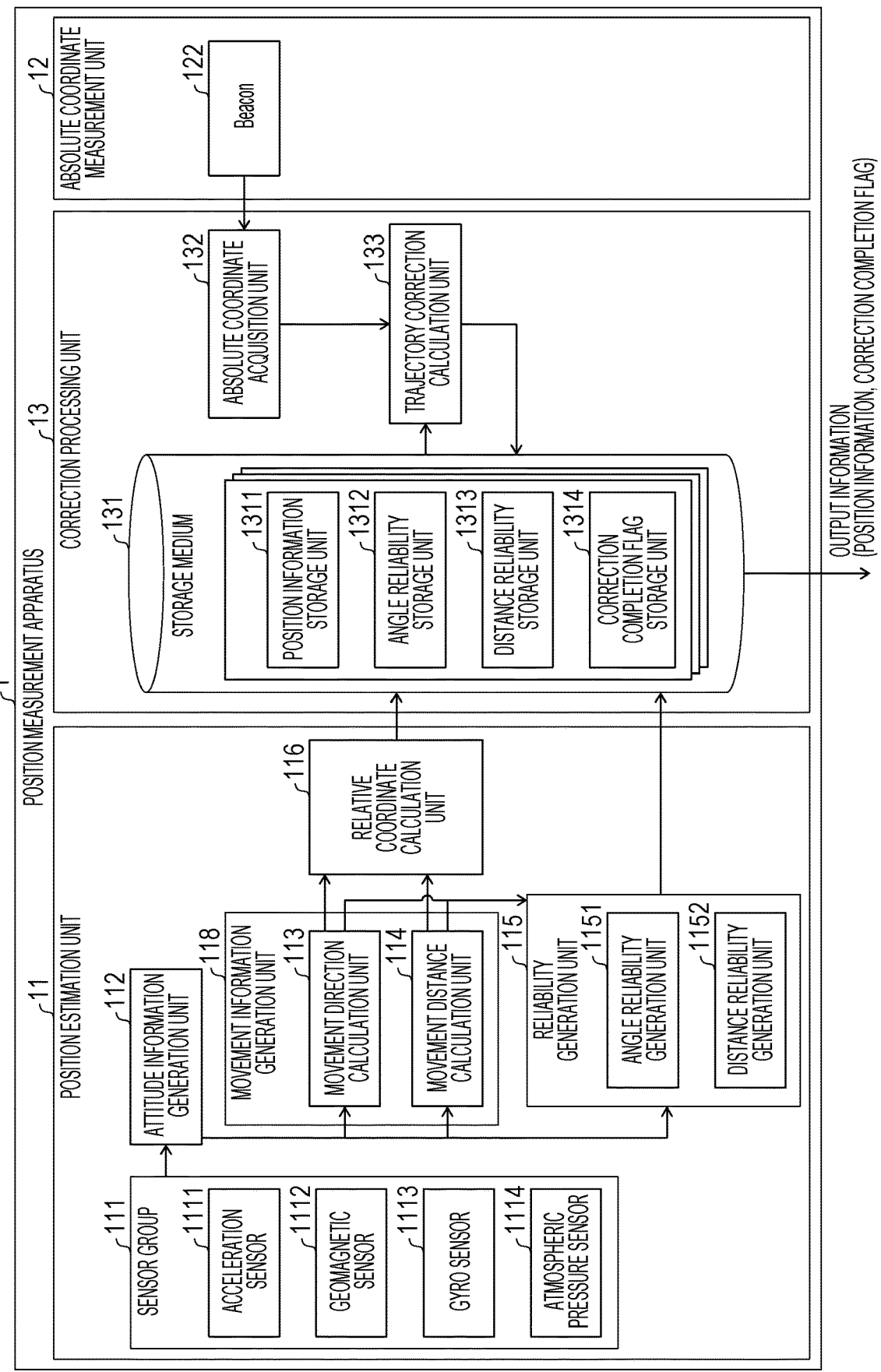
FIG. 17 is a block diagram schematically illustrating an example of a configuration of a position measurement apparatus according to a second embodiment of the present disclosure.
Figure 18:
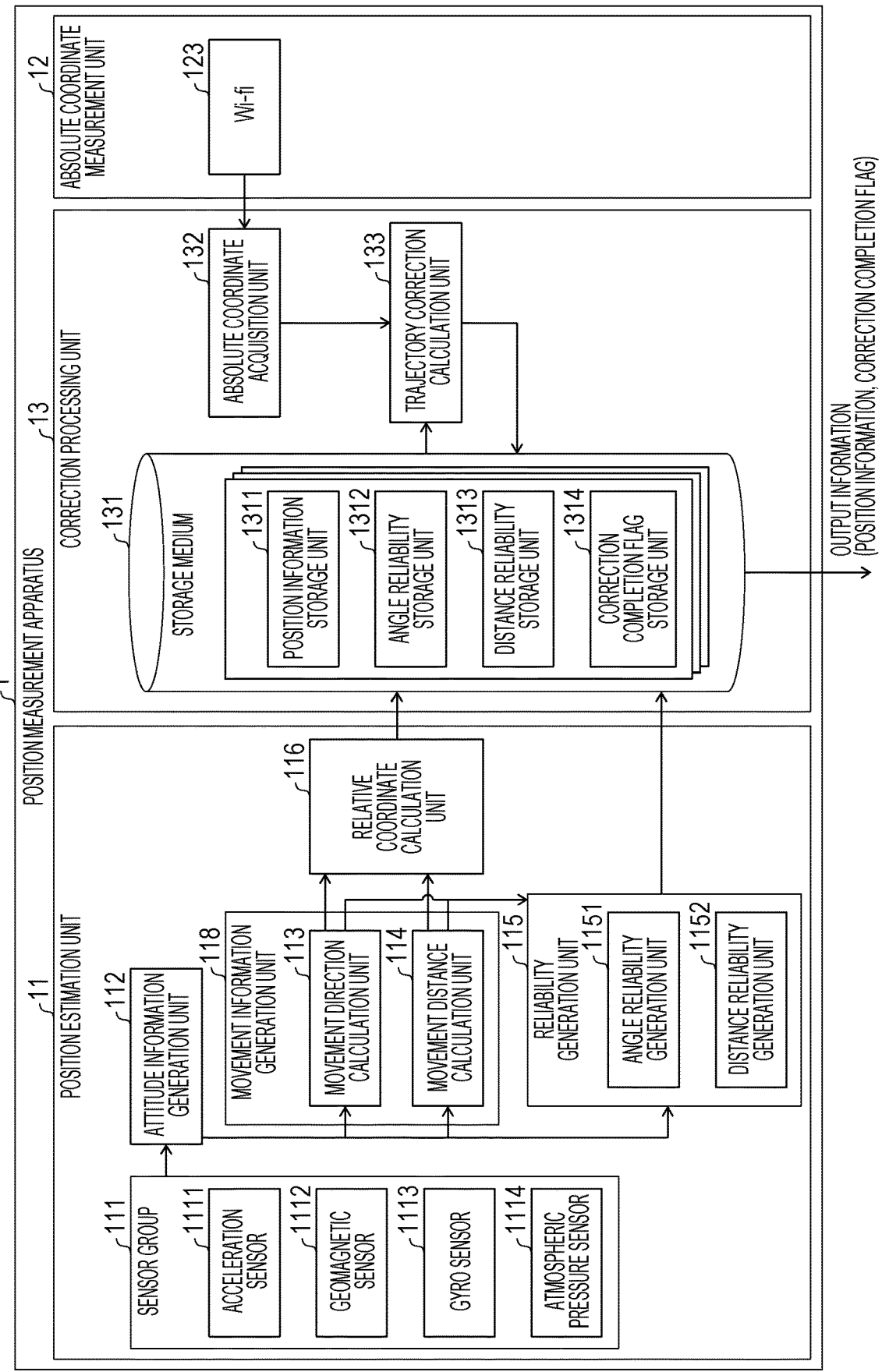
FIG. 18 is a block diagram schematically illustrating an example of a configuration of a position measurement apparatus according to a third embodiment of the present disclosure.
Figure 19:
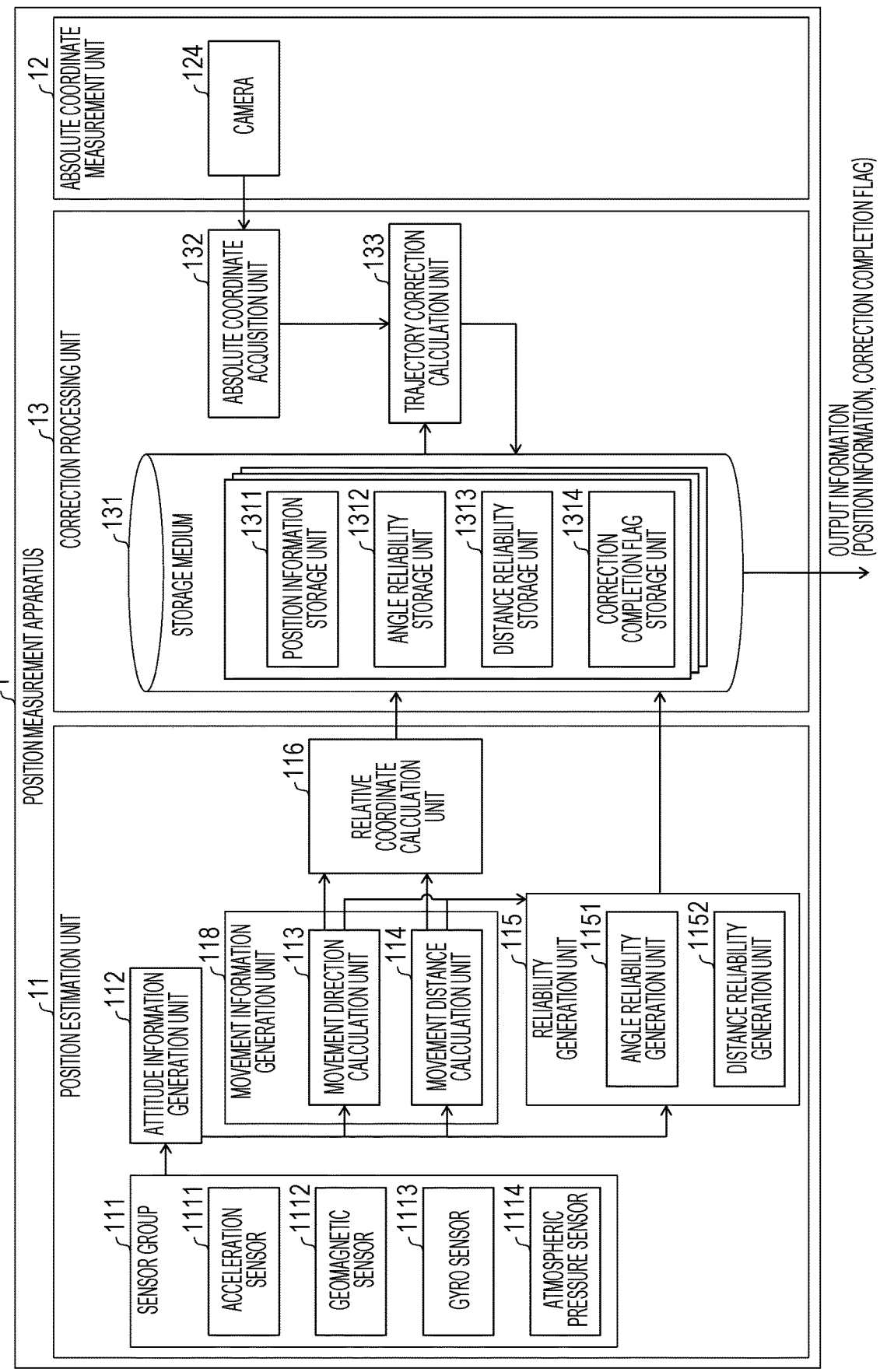
FIG. 19 is a block diagram schematically illustrating an example of a configuration of a position measurement apparatus according to a fourth embodiment of the present disclosure.

The configuration of the absolute coordinate measurement unit 12 is not limited to the example described above in which the absolute coordinates are measured from the received GPS signal. FIGS. 17 to 19 each illustrate an example of another configuration of the absolute coordinate measurement unit 12.

In the example illustrated in FIG. 17, the absolute coordinate measurement unit 12 includes a beacon receiver 122 configured to receive a radio wave or an infrared ray transmitted from a beacon installed on a road, thereby measuring absolute coordinates. The absolute coordinate measurement unit 12 may acquire absolute coordinates such that when a radio wave or a infrared ray transmitted from a beacon is received by the beacon receiver 122, if the strength thereof is greater than a predetermined threshold value, the absolute coordinate measurement unit 12 acquires installation coordinates of the beacon as the absolute coordinates.

In the example illustrated in FIG. 18, the absolute coordinate measurement unit 12 includes a Wi-Fi receiver 123 configured to receive a Wi-Fi radio wave thereby measuring absolute coordinates. The absolute coordinate measurement unit 12 may receive a plurality of Wi-Fi (registered trademark) radio waves via the Wi-Fi receiver 123, and may calculate coordinates of the current position from coordinate information and radio wave strength information from each base station using a triangulation technique thereby determining absolute coordinates.

The absolute coordinate measurement unit 12 may measure absolute coordinates by acquiring an image marker. In the example illustrated in FIG. 19, the absolute coordinate measurement unit 12 includes a camera 124, and acquires an image marker by analyzing an image captured by the camera 124 thereby acquiring installation coordinates of the image marker. The acquired installation coordinates of the image marker are employed as the absolute coordinates. The camera 124 may be installed on the position measurement apparatus 1 such that the camera 124 is capable of automatically capturing an image of surroundings when the position measurement apparatus 1 is moving. When the absolute coordinate measurement unit 12 finds a pattern of an installed image marker in an image captured by the camera 124 and when the size of the recognized image marker in the image is greater than a particular value, the absolute coordinate measurement unit 12 may determine that the absolute coordinate measurement unit 12 is located close to the position of the image marker, and may employ installation coordinates of the image marker as the absolute coordinates.

The absolute coordinate measurement unit 12 may measure absolute coordinates using one of or a combination of the following: the GPS sensor 121; the beacon receiver 122; the Wi-Fi receiver 123; and the camera 124.

The position measurement apparatus 1 may function as a position information acquisition system used together with an installed terminal 2 having installation coordinate information such as a beacon, Wi-Fi (registered trademark), an image marker or the like, and may acquire absolute coordinates of the position measurement apparatus 1 by acquiring, from the installed terminal 2, information associated with the installation coordinates of the installed terminal 2.

FIG. 21 illustrates a position information acquisition system in which the installed terminal 2 is a beacon, an image marker, or the like. For example, the installed terminal 2 is installed in a store. When the user wearing the position measurement apparatus 1 comes near this store, the position measurement apparatus 1 receives absolute coordinates of the installed terminal 2 installed in the store and thus the position measurement apparatus 1 detects that the user is located close to the store.

In the example illustrated in FIG. 21, it is assumed by way of example that the user wearing the position measurement apparatus 1 walks in a coverage area of a radio wave or an infrared ray transmitted by the installed terminal 2 installed in a store A. In FIG. 21, a broken circular line indicates the coverage area of the radio wave or the infrared ray transmitted by the installed terminal 2. When the user walks in the coverage area of the radio wave or the infrared ray transmitted by the installed terminal 2 installed in the store A, the position measurement apparatus 1 receives absolute coordinates transmitted from the installed terminal 2 installed in the store A. The position measurement apparatus 1 may also receive, for example, an advertisement or the like of the store A together with the absolute coordinates.

In response to receiving the absolute coordinates, the position measurement apparatus 1 may output information associated with a trajectory of a moving path of the user to the installed terminal 2. The information associated with the trajectory may indicate, for example, a path along which the user reaches the store. In the example illustrated in FIG. 21, when the user walks in the coverage area of the radio wave or the infrared ray transmitted by the installed terminal 2 installed in the store A, information indicating a moving path represented by a curved line arrow along which the user walks from a store C to the store A via a store B may be output to the installed terminal 2.

In a case where the installed terminal 2 is an image marker, the broken circular line indicates an area in which an image of an image marker recognized by the camera 124 installed on the position measurement apparatus 1 has a size greater than a particular value, and, within this area, the position measurement apparatus 1 receives absolute coordinates of the installed terminal 2.

Figure 22:
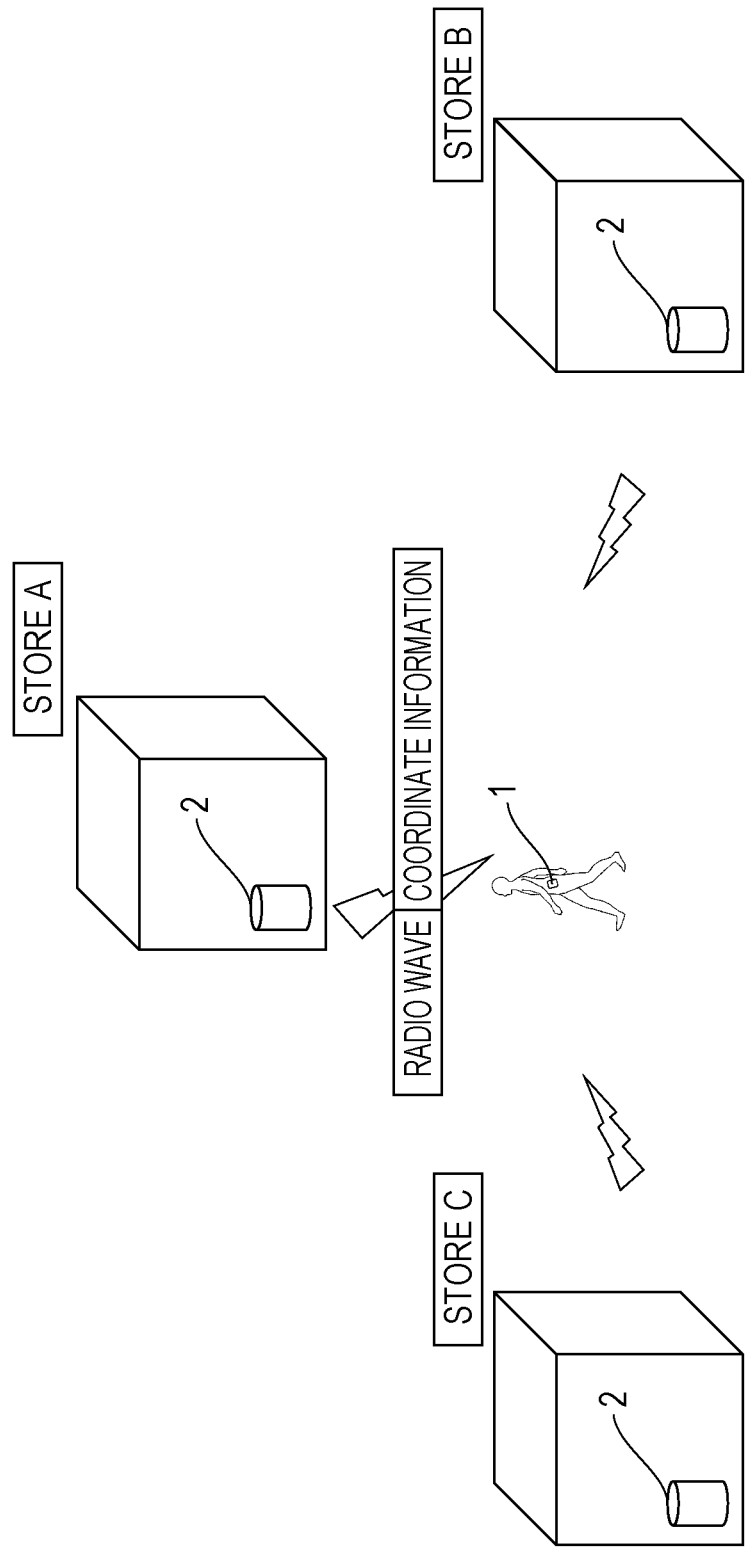
FIG. 22 is a diagram illustrating an example of a position information acquisition system according to an embodiment of the present disclosure.

In FIG. 22, it is assumed by way of example that the installed terminal 2 transmits a Wi-Fi radio wave. In the example illustrated in FIG. 22, the Wi-Fi radio wave transmitted by the installed terminal 2 installed in each store is received by a position measurement apparatus 1. When the user walks near the store A, the Wi-Fi radio wave transmitted by the installed terminal 2 installed in the store A is received by the position measurement apparatus 1 via the Wi-Fi receiver 123. Wi-Fi radio waves transmitted by installed terminals 2 installed in the store B and the store C are also received. By receiving a plurality of Wi-Fi radio waves as described above, it becomes possible to obtain absolute coordinates by calculating the coordinates of the current position using coordinate information provided from each base station and information indicating the radio wave strength.

As described above, when the position measurement apparatus 1 is operated in the position information acquisition system together with installed terminals 2 having installation coordinate information such as a beacon, a Wi-Fi, an image marker, or the like, it is possible to effectively use the information about the position of the user or information about the trajectory of the moving path dependent on the movement of the user based on the acquired absolute coordinates of the position measurement apparatus 1.

Note that, alternatively, the absolute coordinate measurement unit 12 may measure absolute coordinates using another known method.

Configuration of Correction Processing Unit 13

The correction processing unit 13 includes a storage unit 131 and a trajectory correction calculation unit 133. The correction processing unit 13 also includes an absolute coordinate acquisition unit 132 configured to acquire absolute coordinates from the absolute coordinate measurement unit 12.

The correction processing unit 13 has a function of correcting a position of the position measurement apparatus 1 estimated by the position estimation unit 11 based on absolute coordinates of the position measurement apparatus 1 measured by the absolute coordinate measurement unit 12. The correction processing unit 13 determines an amount of distance correction to be made every predetermined number of steps of the user and an amount of angle correction to be made every predetermined number of steps of the user based on information generated by the reliability generation unit 115 in terms of a movement direction every predetermined number of steps and reliability information indicating a reliability value of a movement distance every predetermined number of steps of the user, and movement information generated by the movement information generation unit 118 in terms of a movement direction every predetermined number of steps of the user and a movement distance every predetermined number of steps of the user. The correction processing unit 13 then corrects the movement distance and the movement direction every predetermined number of steps of the user starting from the latest already-corrected position information according to the determined distance correction amount every predetermined number of steps of the user and the angle correction amount every predetermined number of steps of the user.

The storage unit 131 is a storage configured to store various kinds of data used by the correction processing unit 13. The storage unit 131 may also store various programs for executing functions of the position measurement apparatus 1. The storage unit 131 may be realized by one of or a combination of non-volatile memories capable of rewriting contents stored therein such as an EPROM, an EEPROM (registered trademark), an HDD, a flash memory, etc.

The storage unit 131 includes a position information storage unit 1311 configured to store corrected position information corrected by the correction processing unit 13. The position information storage unit 1311 stores a relative position of the position measurement apparatus 1 calculated by the relative coordinate calculation unit 116 in the position estimation unit 11. The position information storage unit 1311 also stores position information indicating a corrected position at an ith step of the user represented in coordinates (xpi, ypi).

The storage unit 131 also includes an angle reliability storage unit 1312 configured to store an angle reliability value estimated by the angle reliability generation unit 1151 in the position estimation unit 11 and a distance reliability storage unit 1313 configured to store a distance reliability value estimated by the distance reliability generation unit 1152.

The storage unit 131 further includes a correction completion flag storage unit 1314 configured to store information indicating whether the position information at the ith step of the user has been corrected or not.

The trajectory correction calculation unit 133 corrects the movement trajectory of the position measurement apparatus 1 based on the information stored in the storage unit 131 in terms of the position information, the angle reliability value, the distance reliability value, and the correction completion flag and the absolute coordinates measured by the absolute coordinate measurement unit 12.

Example of Position Measurement Using Gyro Sensor and Geomagnetic Sensor

A specific example of the position measurement is described below for a case where the gyro sensor 1113 and the geomagnetic sensor 1112 are used.

The position measurement apparatus 1 corrects the trajectory by correcting the movement direction (attitude) when the trajectory of the movement of the device of interest being subjected to the position measurement is output. The position measurement apparatus 1 measures the attitude and then measures the movement direction, using the gyro sensor 1113 and the geomagnetic sensor 1112.

The movement direction calculation unit 113 in the movement information generation unit 118 generates the information associated with the movement direction by integrating the sensor values acquired from the gyro sensor 1113.

In a case where there is a difference between an azimuth angle (an angle about an axis defined in the zenith direction) based on the sensor values of the gyro sensor 1113 and an azimuth angle based on the sensor values of the geomagnetic sensor 1112, this difference can cause the trajectory of the moving path estimated by the position estimation unit 11 to deviate from the correct trajectory of the moving path.

The reliability generation unit 115 generates the reliability value of the angle by calculating the difference between the information associated with the movement direction obtained by integrating the values acquired from the gyro sensor 1113 and the information associated with the movement direction acquired from the geomagnetic sensor 1112.

The trajectory correction calculation unit 133 performs a trajectory correction, as described later, using the reliability value of the angle determined based on the difference described above. By using, in the trajectory correction, the reliability value indicating the difference between the azimuth angle based on the sensor values of the gyro sensor 1113 and the azimuth angle based on the sensor values of the geomagnetic sensor 1112 as described above, it becomes possible to make proper corrections at a location where there is local distortion and at a location where the trajectory has a correct shape.

In the present embodiment, the attitude information associated with the position measurement apparatus 1 calculated using the gyro sensor 1113 and the geomagnetic sensor 1112 is subjected to a coordinate transformation (coordinate axis transformation) process performed by the attitude information generation unit 112 thereby generating relative position information. The relative position information generated by the attitude information generation unit 112 is stored, together with the reliability value, in the storage unit 131 every step of the user. Note that a known Kalman filter or the like may be used in the coordinate transformation process performed by the attitude information generation unit 112.

The correction of the moving path trajectory is performed in response to measuring the absolute coordinates of the position measurement apparatus 1 by the absolute coordinate measurement unit 12. The correction of the moving path trajectory is performed on all pieces of uncorrected position information and all uncorrected reliability values stored in the storage unit 131. The correction of the moving path trajectory is performed over a whole correction interval given by an interval of measuring absolute coordinates at a time. The correction of the moving path trajectory is performed on the position information of each step within the correction interval using the reliability value corresponding to the position information of each step. As a result, a local correction is achieved.

Method of Trajectory Correction

When the information stored in the storage unit 131 includes uncorrected position information and also includes an angle reliability value and a distance reliability value corresponding to the uncorrected position information, if the correction processing unit 13 acquires absolute coordinates of the position measurement apparatus 1 from the absolute coordinate measurement unit 12 via the absolute coordinate acquisition unit 132, the correction processing unit 13 performs a correction on the uncorrected position information thereby correcting the trajectory of the moving path of the position measurement apparatus 1.

Figure 6:
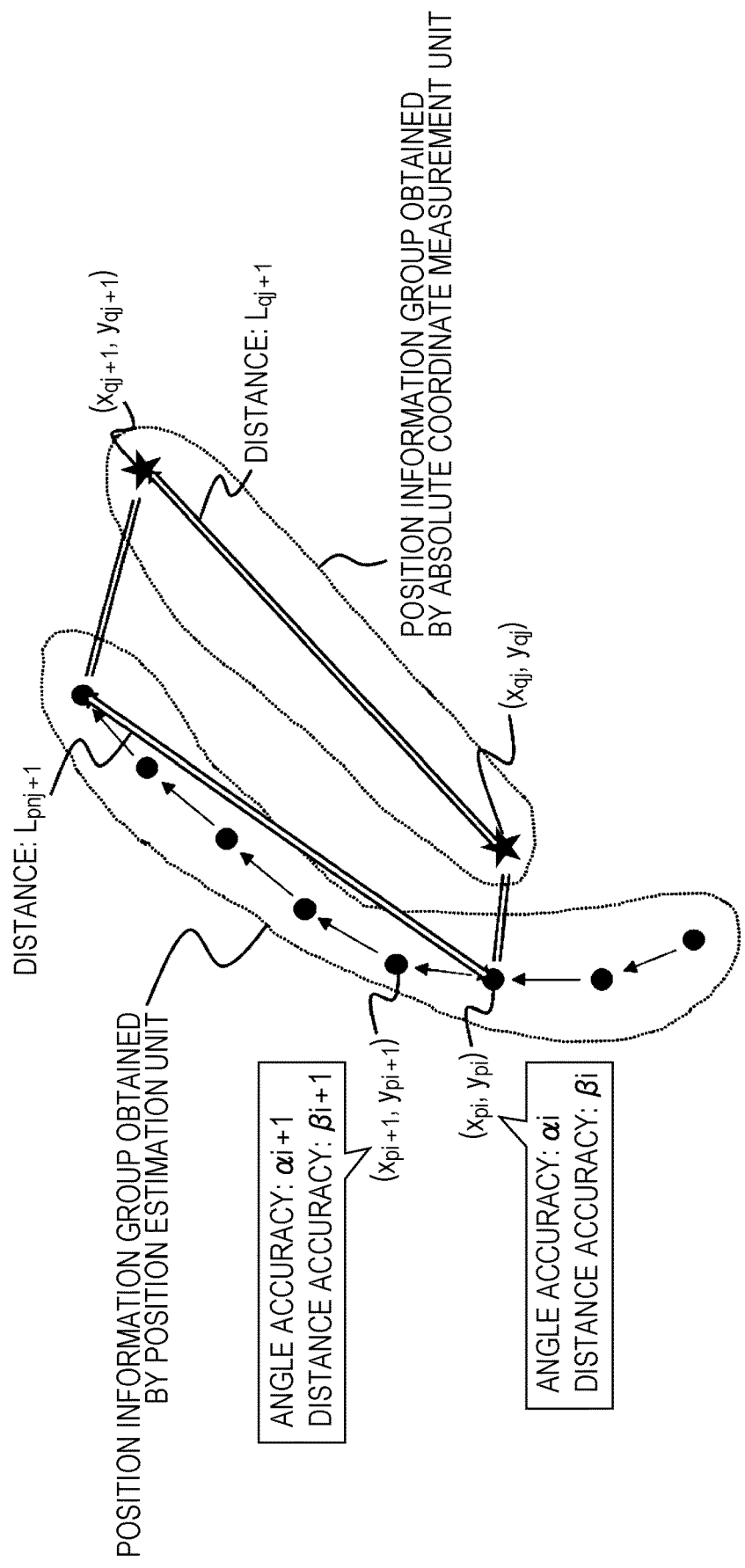
FIG. 6 is a diagram illustrating variables used by a trajectory correction unit according to the first embodiment of the present disclosure.
Figure 7:
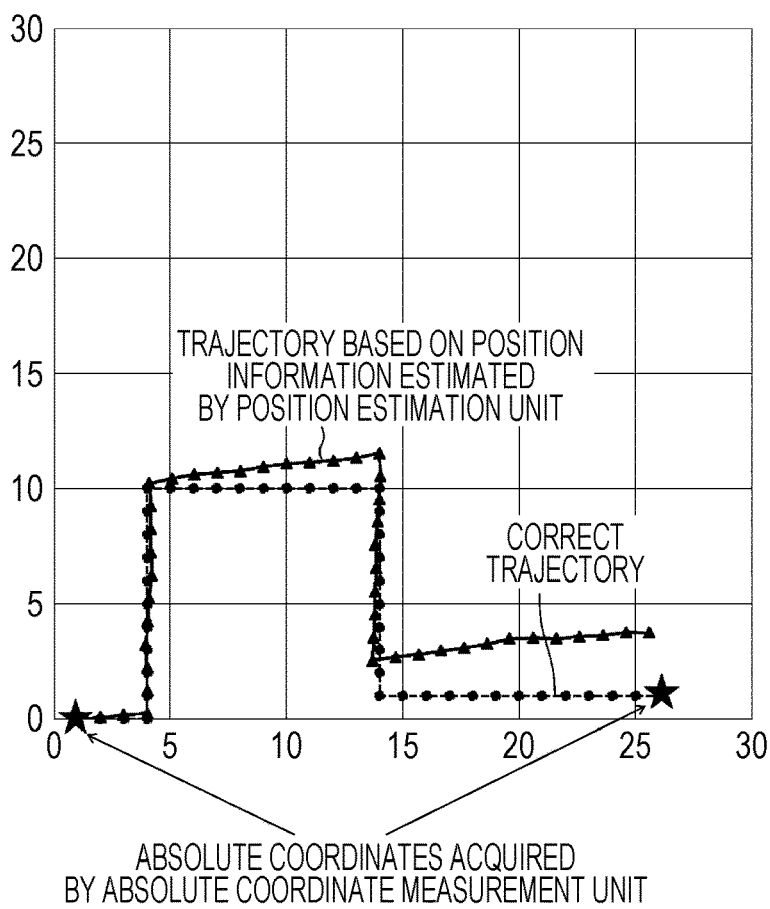
FIG. 7 is a diagram illustrating a moving path including a gyro sensor abnormality, for use in explaining usefulness of the first embodiment of the present disclosure.

FIG. 6 is a diagram illustrating variables used by the trajectory correction calculation unit 133. FIG. 7 is a diagram illustrating a trajectory of a movement of a position estimated by the position estimation unit 11 and also illustrating a deviation thereof from an actual movement trajectory. Let $(x_{pi}, y_{pi})$ denote coordinates indicating a position of the user at an ith step estimated by the position estimation unit 11 and stored in the storage unit 131 of the correction processing unit 13 as illustrated in FIG. 6 and FIG. 7. Furthermore, let $(x_{qj}, y_{qj})$ denote jth absolute coordinates measured by the absolute coordinate measurement unit 12 and stored in the storage unit 131 of the correction processing unit 13.

Let it be assumed here that among all pieces of position information stored in the position information storage unit 1311, the most lately corrected position information as of when jth absolute coordinates are acquired is that with coordinates of an $n_j$th step, and a further trajectory correction is performed on position information with coordinates of an $n_m$th step to an $n_{m+1}$th step acquired within an absolute-coordinate-acquisition interval from mth to (m+1)th absolute coordinates.

The position information associated with the ith step (where $i=n_m$) stored in the position information storage unit 1311 has been already subjected to the trajectory correction when mth absolute coordinates were acquired. Therefore, the further trajectory correction is performed in a range $i=n_m+1$ to $n_{m+1}$. Note that the correction completion flag is not set for any data in the range from $i=n_m+1$ to $n_{m+1}$ stored in the correction completion flag storage unit 1314, that is, the correction has not been yet performed on the data in this range.

Before the trajectory correction process is performed, the trajectory correction calculation unit 133 determines the total sum of angle reliability values and the total sum of distance reliability values assigned to corresponding pieces of the uncorrected position information associated with respective walking steps estimated by the position estimation unit 11.

The trajectory correction calculation unit 133 then determines the differences of the distance and the angle, measured starting from the latest already-corrected position information, from the distance and the angle determined from the absolute coordinates measured by the absolute coordinate measurement unit 12. Furthermore, the trajectory correction calculation unit 133 determines the differences in the distance and the angle between the latest estimated position information estimated by the position estimation unit 11 and the latest already-corrected position information.

The trajectory correction calculation unit 133 calculates the movement distance $L_{qm+1}$ from the mth absolute coordinates to the (m+1)th absolute coordinates according to equation (1) shown below.

$$L_{qm+1} = \sqrt{(x_{qm+1}-x_{qm})^2+(y_{qm+1}-y_{qm})^2} \tag{1}$$

Furthermore, the trajectory correction calculation unit 133 calculates the movement distance $L_{pn_{m+1}}$ estimated by the position estimation unit 11 for a range corresponding to the movement distance $L_{qm+1}$ described above, according to equation (2) shown below.

$$L_{pn_{m+1}} = \sqrt{\left(x_{pn_{m+1}} - x_{pn_m}\right)^2 + \left(y_{pn_{m+1}} - y_{pn_m}\right)^2} \tag{2}$$

The trajectory correction calculation unit 133 calculates the overall distance reliability value β based on the total sum of the distance reliability values according to equation (3) shown below.

$$\frac{1}{\beta} = \sum_{x=n_m+1}^{n_{m+1}} \frac{1}{\beta_x} \tag{3}$$

Using these equations (1) to (3), the trajectory correction calculation unit 133 calculates and (m+1)th distance correction coefficient $\Delta\beta_{m+1}$ according to equation (4) shown below.

$$\Delta\beta_{m+1} = \left(L_{qm+1}/L_{pn_{m+1}}\right)*\beta \tag{4}$$

Furthermore, the trajectory correction calculation unit 133 calculates an inclination angle $\theta_{qm+1}$ of a line connecting mth and (m+1)th absolute coordinates according to equation (5) shown below.

$$\tan\theta_{qm+1} = \frac{x_{qm+1} - x_{qm}}{y_{qm+1} - y_{qm}} \tag{5}$$

The trajectory correction calculation unit 133 calculates an inclination angle $\theta_{pnm+1}$ of a line connecting coordinates at an $n_{m+1}$th step and coordinates at an $n_m$th step in the position information according to equation (6) shown below.

$$\tan\theta_{pn_{m+1}} = \frac{x_{p n_{m+1}} - x_{p n_m}}{y_{p n_{m+1}} - y_{p n_m}} \quad (6)$$

The trajectory correction calculation unit 133 calculates an overall angle reliability value $\alpha$ based on the total sum of angle reliability values according to equation (7) shown below.

$$\frac{1}{\alpha} = \sum_{x=n_m+1}^{n_{m+1}} \frac{1}{\alpha_x} \quad (7)$$

The trajectory correction calculation unit 133 calculates an (m+1)th angle correction coefficient $\Delta\alpha_{m+1}$ according to equation (8) shown below.

$$\Delta\alpha_{m+1} = (\theta_{q_{m+1}} - \theta_{p n_{m+1}}) * \alpha \quad (8)$$

The trajectory correction calculation unit 133 performs the correction process on the position information in the range of $i=n_m+1$ to $n_{m+1}$ steps using the distance correction coefficient $\Delta\beta_{m+1}$ calculated according to equation (4) and the angle correction coefficient $\Delta\alpha_{m+1}$ calculated according to equation (8).

First-Stage Distance Correction

The trajectory correction calculation unit 133 repeatedly adds the sum of the distance reliability value and $\Delta\beta$ to each movement distance. More specifically, the trajectory correction calculation unit 133 performs a calculation according to equations (9) and (10) shown below where $x_i$ denotes an x component of coordinates of ith step position information, and $x'_i$ denotes a corrected component.

$$x'_{p n_m} = x_{p n_m} \quad (9)$$

$$x'_{p_i} = (x_{p_i} - x_{p_{i-1}}) * \frac{1}{\beta_i} * \Delta\beta + x'_{p_{i-1}} \; (i = n_m + 1 \sim n_{m+1}) \quad (10)$$

The trajectory correction calculation unit 133 also performs a calculation for a y component according to equations (11) and (12) shown below where $y_i$ denotes the y component of coordinates of ith step position information, and $y'_i$ denotes a corrected component.

$$y'_{p n_m} = y_{p n_m} \quad (11)$$

$$y'_{p_i} = (y_{p_i} - y_{p_{i-1}}) * \frac{1}{\beta_i} * \Delta\beta + y'_{p_{i-1}} \; (i = n_m + 1 \sim n_{m+1}) \quad (12)$$

Angle Correction

The trajectory correction calculation unit 133 performs an angle correction process on the coordinates $(x'_{pi}, y'_{pi})$, which have been subjected to the first-stage distance correction, using the angle reliability value and $\Delta\alpha$. Note that in this angle correction process, the trajectory correction calculation unit 133 uses an additional parameter V different from $\Delta\alpha$. That is, the trajectory correction calculation unit 133 performs the angle correction process on the coordinates $(x'_{pi}, y'_{pi})$, which have been subjected to the first-stage distance correction, according to equations (13) to (15) shown below.

$$\theta'_{p_i} = \tan^{-1}\left(\frac{x'_{p_i} - x'_{p_{i-1}}}{y'_{p_i} - y'_{p_{i-1}}}\right) \quad (13)$$

$$x''_{p_i} = (x'_{p_i} - x'_{p_{i-1}}) * \cos\left(\theta_{p_i} + \frac{1}{\alpha_i} * \Delta\alpha * V\right) - (y'_{p_i} - y'_{p_{i-1}}) * \sin\left(\theta_{p_i} + \frac{1}{\alpha_i} * \Delta\alpha * V\right) + x'_{p_{i-1}} \; (i = n_m + 1 \sim n_{m+1}) \quad (14)$$

$$y''_{p_i} = (y'_{p_i} - y'_{p_{i-1}}) * \cos\left(\theta_{p_i} + \frac{1}{\alpha_i} * \Delta\alpha * V\right) - (x'_{p_i} - x'_{p_{i-1}}) * \sin\left(\theta_{p_i} + \frac{1}{\alpha_i} * \Delta\alpha * V\right) + y'_{p_{i-1}} \; (i = n_m + 1 \sim n_{m+1}) \quad (15)$$

Furthermore, the trajectory correction calculation unit 133 calculates an inclination angle $\theta''_{pnm+1}$ between the $n_m$th walking step and the $n_{m+1}$th walking step according to equation (16) shown below.

$$\theta''_{p n_{m+1}} = \tan^{-1}\left(\frac{x''_{p n_{m+1}} - x''_{p n_m}}{y''_{p n_{m+1}} - y''_{p n_m}}\right) \quad (16)$$

The trajectory correction calculation unit 133 compares the calculated inclination angle $\theta''_{pnm+1}$ with the inclination angle $\theta_{qm+1}$ (equation (5)), and finds a value of V that minimizes this difference and uses it. This value of V may be determined, for example, using the Newton's method or the like.

Second-Stage Distance Correction

In a case where the method of calculating the movement distance is perfect, the first-stage distance correction and the angle correction cause the position indicated by the $n_{m+1}$th step coordinates to be coincident with the position indicated by the (m+1)th absolute coordinates. However, in practice, the calculation method may not be perfect, and thus there may be possibility that the position indicated by the $n_{m+1}$th step coordinates is not coincident with the position indicated by the (m+1)th absolute coordinates. In such a case, the trajectory correction calculation unit 133 enlarges or reduces the angle-corrected moving path such that the $n_{m+1}$th step position is coincident with the position of the (m+1)th absolute coordinates.

In a similar manner to the first-stage distance correction, the trajectory correction calculation unit 133 calculates $L''_{pnm+1}$ and $L_{qm+1}$ (according to equation (1)) and calculates a processing factor $\gamma$ according to equations (17) and (18) shown below.

$$L''_{p n_{m+1}} = \sqrt{(x''_{p n_{m+1}} - x''_{p n_m})^2 + (y''_{p n_{m+1}} - y''_{p n_m})^2} \quad (17)$$

$$\gamma = \frac{L_{q_{m+1}}}{L''_{p n_{m+1}}} \quad (18)$$

Using this γ, the trajectory correction calculation unit 133 corrects the coordinates $(x''_{pi}, Y''_{pi})$ $(i=n_m+1$ to $n_{m+1})$ according to equations (19) to (22) thereby determining $(x'''_{pi}, y'''_{pi})$.

$$x'''_{p_{n_m}} = x''_{p_{n_m}} \qquad (19)$$

$$x'''_{p_i} = (x''_{p_i} - x''_{p_{i-1}})*\gamma + x''_{p_{i-1}} \ (i = n_m + 1 \sim n_{m+1}) \qquad (20)$$

$$y'''_{p_{n_m}} = y''_{p_{n_m}} \qquad (21)$$

$$y'''_{p_i} = (y''_{p_i} - y''_{p_{i-1}})*\gamma + y''_{p_{i-1}} \ (i = n_m + 1 \sim n_{m+1}) \qquad (22)$$

The trajectory correction calculation unit 133 corrects position information stored in the position information storage unit 1311 associated with the $(n_m+1)$th step to the $n_{m+1}$th step to $(x'''_{pi}, y'''_{pi})$ $(i=n_m+1$ to $n_{m+1})$. Furthermore, the trajectory correction calculation unit 133 changes the correction completion flag information stored in the correction completion flag storage unit 1314 associated with the $(n_m+1)$th step to the $n_{m+1}$th step such that the correction completion flag information is set to indicate that the correction has been made. Thus, the trajectory correction process performed by the trajectory correction calculation unit 133 is completed.

Effects of the Present Embodiment

Figure 8:
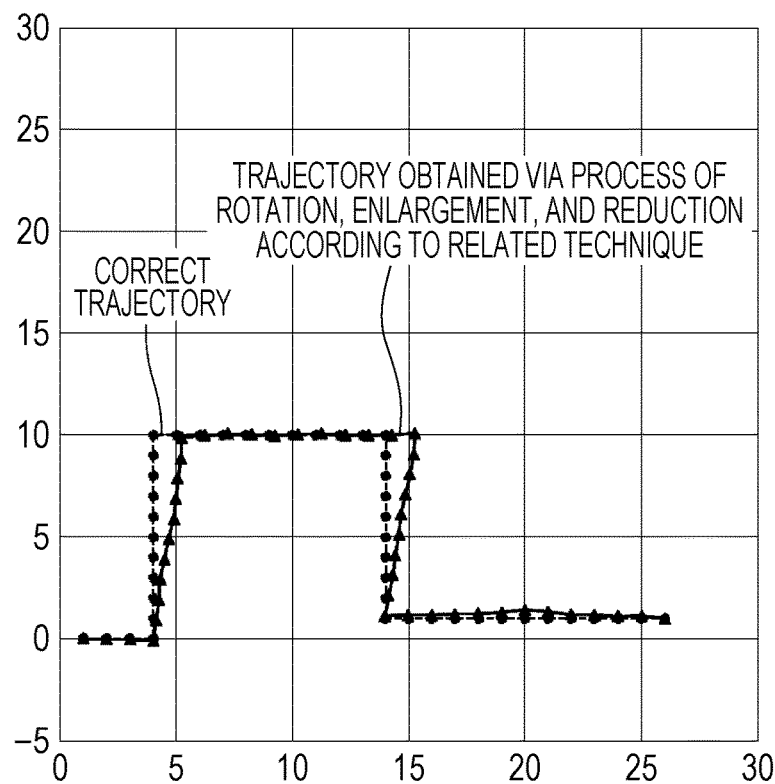
FIG. 8 is a diagram illustrating a manner in which a moving path illustrated in FIG. 7 is corrected according to a known trajectory correction process.
Figure 9:
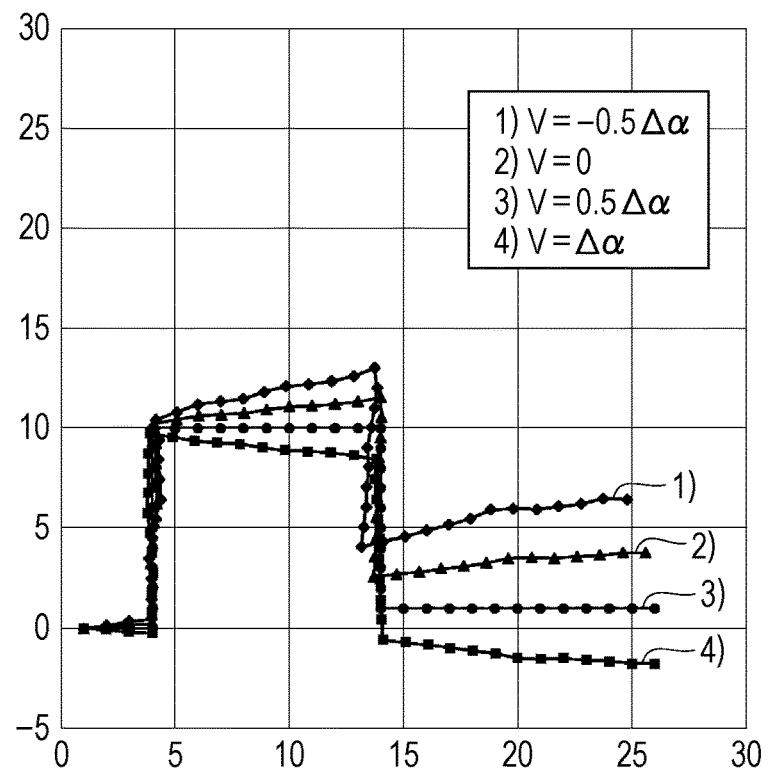
FIG. 9 is a diagram illustrating a manner in which a moving path illustrated in FIG. 7 is corrected using a trajectory correction process according to the first embodiment of the present disclosure.

In a case where a movement trajectory is corrected by performing rotating and/or enlarging according to a known related technique, a destination point can be properly corrected, but a correct trajectory may not be obtained for an intermediate moving path as shown in FIG. 8. In contrast, when the correction method according to the present embodiment is used, as shown in FIG. 9, the moving path changes in response to changing the angle correction coefficient V, and thus it is possible to minimize the deviation of the movement trajectory from the correct moving path by selecting an optimum value for the angle correction coefficient V (in the example shown in FIG. 9, the deviation from the correct moving path is minimized when V=0.5Δα).

Figure 10:
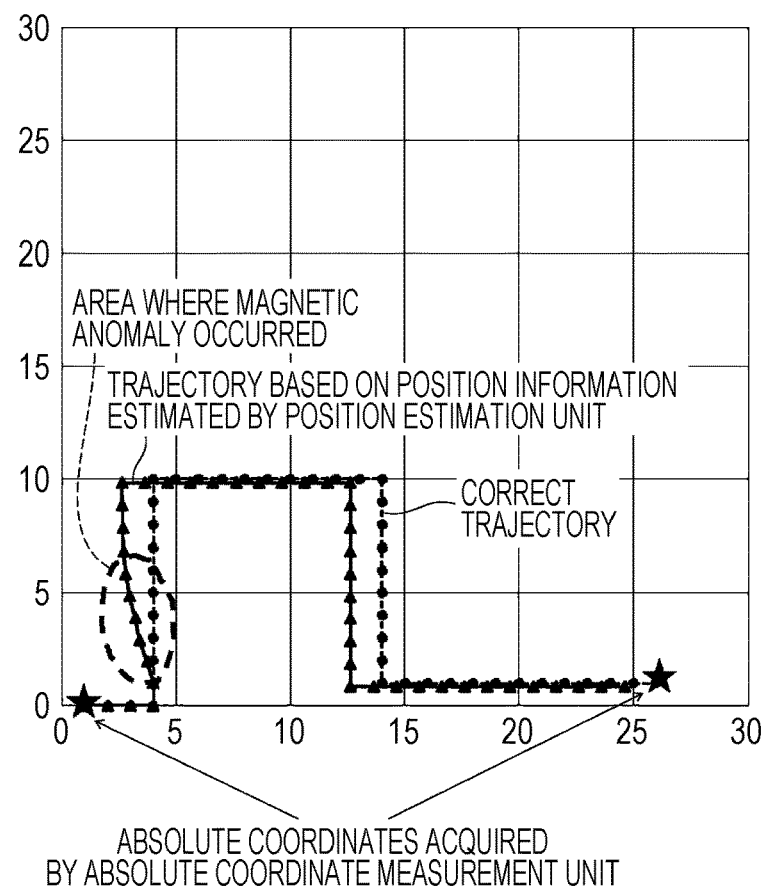
FIG. 10 is a diagram illustrating a moving path including a magnetic anomaly, for use in explaining usefulness of the first embodiment of the present disclosure.
Figure 11:
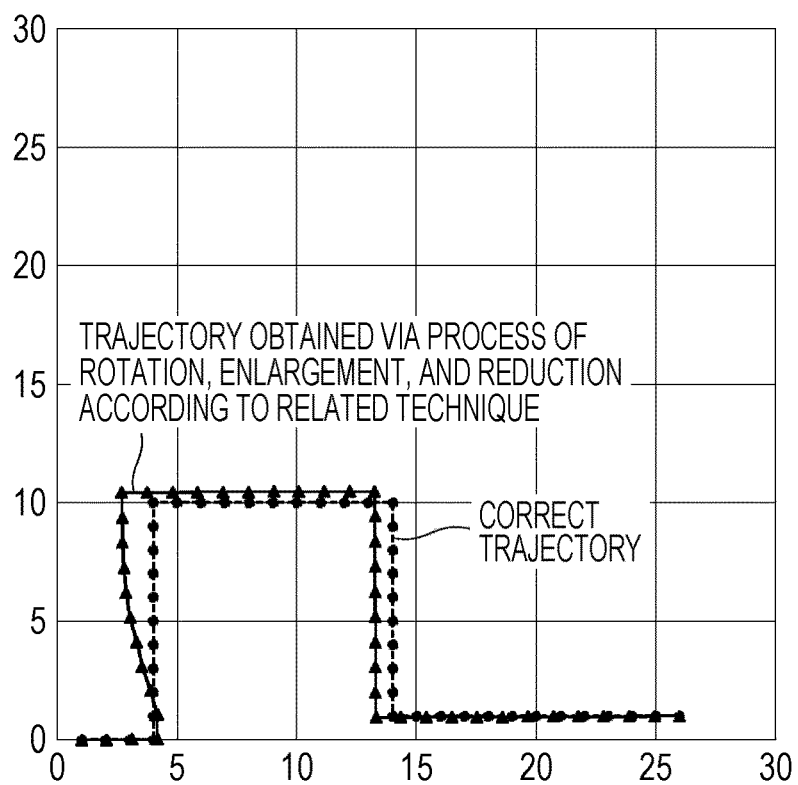
FIG. 11 is a diagram illustrating a manner in which a moving path illustrated in FIG. 10 is corrected according to a known trajectory correction process.
Figure 12:
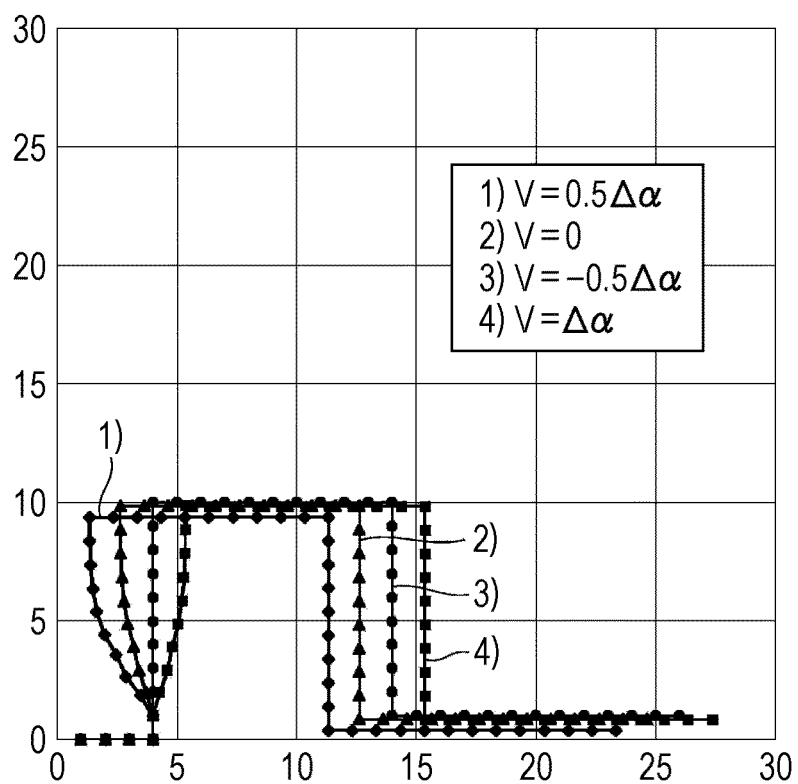
FIG. 12 is a diagram illustrating a manner in which a moving path illustrated in FIG. 10 is corrected using a trajectory correction process according to the first embodiment of the present disclosure.

Furthermore, as shown in FIG. 10, if there is an abnormality in geomagnetism, this may cause an error in the trajectory of position estimated by the position estimation unit 11. In this case, it is difficult to correct the trajectory by the rotation and/or the enlargement according to the known related technique as shown in FIG. 11. In contrast, when the correction method according to the present embodiment is used, it is possible to obtain a moving path very close to the correct moving path as shown in FIG. 12.

Note that constituent elements and configurations thereof of the present embodiment are not limited to the examples described above, but various replacements and modifications are possible. For example, the installed terminal 2 such as a beacon, an image marker, or the like may be installed in an area where position information is to be acquired such that position information associated with the user carrying the position measurement apparatus 1 can be acquired in this area. In the present embodiment, it is allowed to increase intervals at which the position information represented by absolute coordinates is acquired, and thus it is allowed to correspondingly increase the intervals at which installed terminals 2 are installed, which results in a reduction in the number of installed terminals 2.

In the present embodiment, as described above, use of the reliability value of the position information determined every walking step makes it possible to properly correct the trajectory locally on a point-by-point bases. Therefore, even when the frequency of receiving the GPS signal is reduced, it is possible to maintain high accuracy of the trajectory.

Process Performed Position Estimation Unit 11

Figure 13:
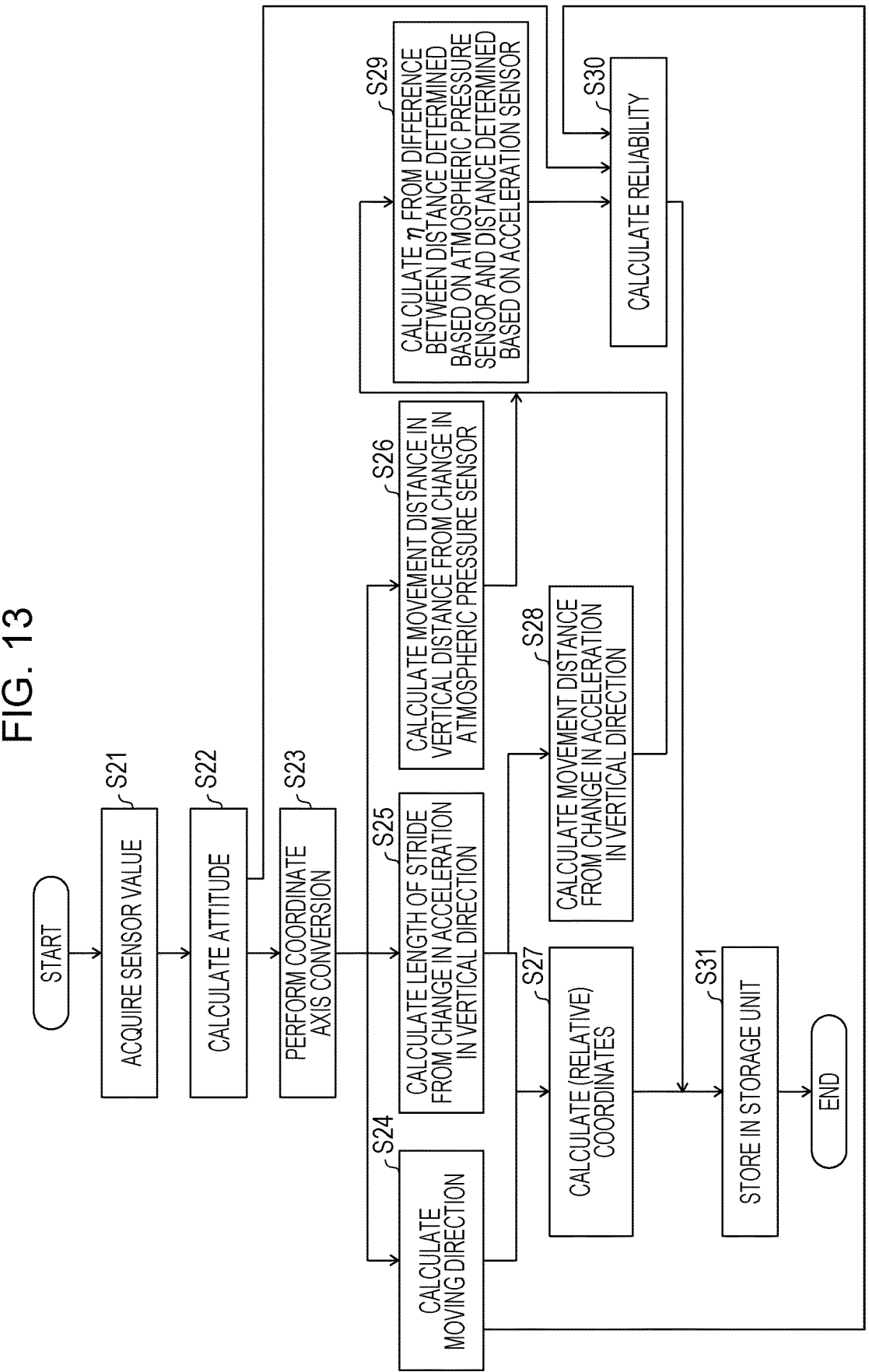
FIG. 13 is a flow chart illustrating a flow of a process of calculating a reliability value of a position measurement apparatus.

FIG. 13 is a flow chart illustrating a flow of a process performed by the position estimation unit 11.

Step S21

The position estimation unit 11 acquires sensor values of the respective sensors included in the sensor group 111.

Step S22

The position estimation unit 11 calculates the attitude of the device of interest using a function of the attitude information generation unit 112. The attitude information generation unit 112 provides, to the reliability generation unit 115, information associated with the attitude obtained using a combination of the sensor values of the acceleration sensor 1111 and the sensor values of the geomagnetic sensor 1112 and also information associated with the attitude obtained using the sensor values of the gyro sensor 1113.

Step S23

The position estimation unit 11 converts the coordinate axes associated with the calculated attitude of the device of interest by using a function of the attitude information generation unit 112 thereby generating attitude information. The attitude information generation unit 112 provides the generated attitude information to the movement information generation unit 118 and the reliability generation unit 115.

Step S24

The movement information generation unit 118 performs the principal component analysis on the horizontal acceleration component of the attitude information generated by the attitude information generation unit 112 by using a function of the movement direction calculation unit 113, and the movement information generation unit 118 employs a direction indicated by the first principal component as the movement direction. The movement information generation unit 118 provides a result of the principal component analysis to the reliability generation unit 115.

Step S25

The movement information generation unit 118 generates, using a function of the movement distance calculation unit 114, information associated with the movement distance from the amount of change of the sensor value in the vertical direction acquired from the acceleration sensor 1111. The movement information generation unit 118 may calculate, using a function of the movement distance calculation unit 114, the length of stride from the attitude information generated by the attitude information generation unit 112 and the change in the acceleration in the vertical direction, and may employ the calculated length of stride as the information associated with the movement distance.

Step S26

The movement information generation unit 118 generates, using a function of the movement distance calculation unit 114, the movement distance in the vertical direction from the amount of change of the sensor value acquired by the atmospheric pressure sensor 1114. The movement information generation unit 118 provides the generated information associated with the movement distance to the reliability generation unit 115.

Step S27

The relative coordinate calculation unit 116 calculates the relative position (relative coordinates) based on the length of stride calculated by the movement distance calculation unit 114 and the movement direction calculated by the movement direction calculation unit 113, and the relative coordinate calculation unit 116 provides the calculated relative position (relative coordinates) to the correction processing unit 13.

Step S28

The movement distance calculation unit 114 calculates the movement distance based on the calculated length of stride and the amount of change of the acceleration based on the sensor values acquired by the acceleration sensor 1111. The movement distance calculation unit 114 provides the calculated movement distance based on the amount of change of the acceleration to the reliability generation unit 115.

Step S29

The reliability generation unit 115 calculates η based on the difference between the movement distance calculated in step S26 and the movement distance calculated in step S28. More specifically, η is calculated as $\eta = L_A / \mathrm{abs}(L_M - L_A)$ where $L_M$ denotes the distance obtained from the atmospheric pressure sensor and $L_A$ denotes the distance obtained from the acceleration sensor.

Step S30

The reliability generation unit 115 determines the difference $\theta_A$ in azimuth angle between the information, calculated in step S22, associated with the attitude obtained from the sensor value of the gyro sensor 1113 and the information associated with the attitude obtained from the combination of the sensor value of the acceleration sensor 1111 and the sensor value of the geomagnetic sensor 1112. Furthermore, the reliability generation unit 115 determines $\theta_B$ using the first principal component and the second principal component obtained as a result of the principal component analysis in step S24. The reliability generation unit 115 generates reliability information indicating the reliability value of the movement information using $\theta_A$, $\theta_B$, and η calculated in step S29. The reliability generation unit 115 provides the generated reliability information to the correction processing unit 13.

Step S31

The correction processing unit 13 stores, in the storage unit 131, the relative position information calculated in step S27 and the reliability information generated in step S30.

Note that in step S30, the reliability generation unit 115 may generate only the reliability information indicating the reliability value of the angle of the attitude based on the difference $\theta_A$ of the azimuth angle between the information associated with the attitude calculated in step S22 using the sensor values of the acceleration sensor 1111 and the geomagnetic sensor 1112 and the information associated with the attitude calculated using the sensor value of the gyro sensor 1113, while the reliability value of the distance may be set to a fixed value, for example, 1.

Alternatively, in step S30, the reliability generation unit 115 may determine $\theta_B$ based on the first principal component and the second principal component obtained as a result of the principal component analysis in step S24 and may generate only the reliability information indicating the reliability value of the angle of the movement direction based on $\theta_B$, while the reliability value of the angle of the attitude may be set to a fixed value, for example, 1.

Figure 14:
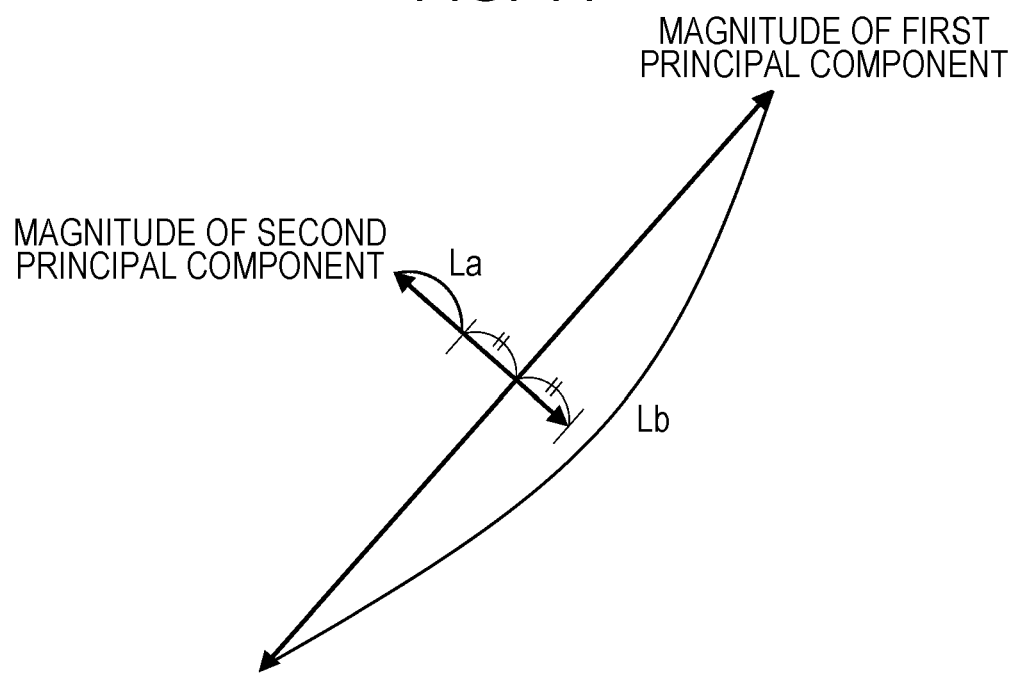
FIG. 14 is a diagram illustrating a manner of calculating a reliability value of an angle.

FIG. 14 is a diagram illustrating a manner of calculating $\theta_B$. The magnitude of the first principal component is denoted by Lb, and The magnitude of the second principal component is denoted by La. Ideally, La=0, and thus $\theta_B = \tan^{-1}(La/Lb)$. By rotating the direction of the first principal component by an amount corresponding to $\theta_B$, it is possible to achieve La=0.

Figure 15B:
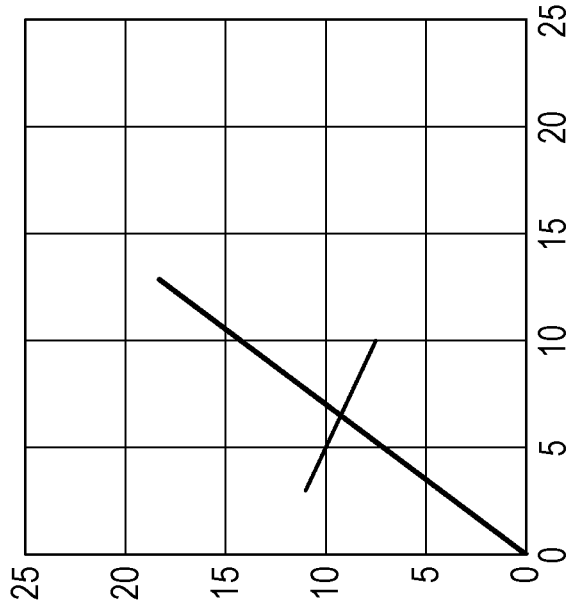
FIGS. 15A and 15B are diagrams each illustrating reliability of an angle.
Figure 15A:
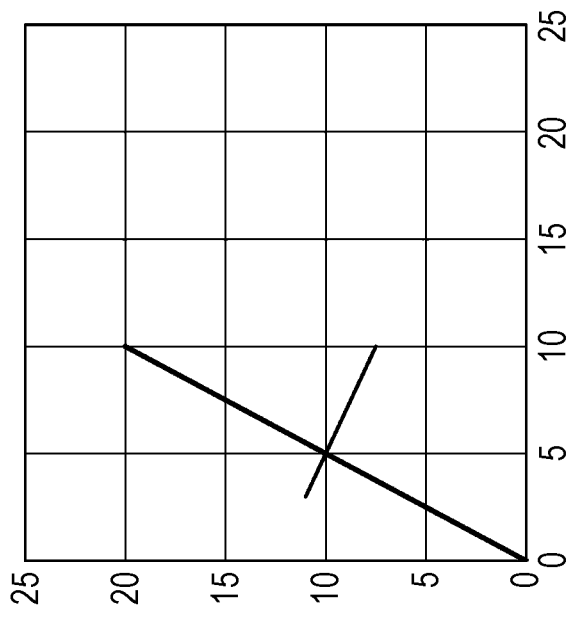

FIG. 15A is a diagram illustrating an example of a result of the principal component analysis. FIG. 15B is a diagram illustrating an example of a result obtained when the first principal component is rotated by an amount corresponding to $\theta_B$. As shown in FIGS. 15A and 15B, it is possible to make La equal to 0 by making a correction by rotating the first principal component by the amount corresponding to $\theta_B$.

In step S30, the reliability generation unit 115 may generating only the reliability information indicating the reliability value of the distance using η calculated in step S29, while the reliability value of the angle may be set to a fixed value, for example, 1.

Process Performed by Correction Processing Unit 13

Figure 16:
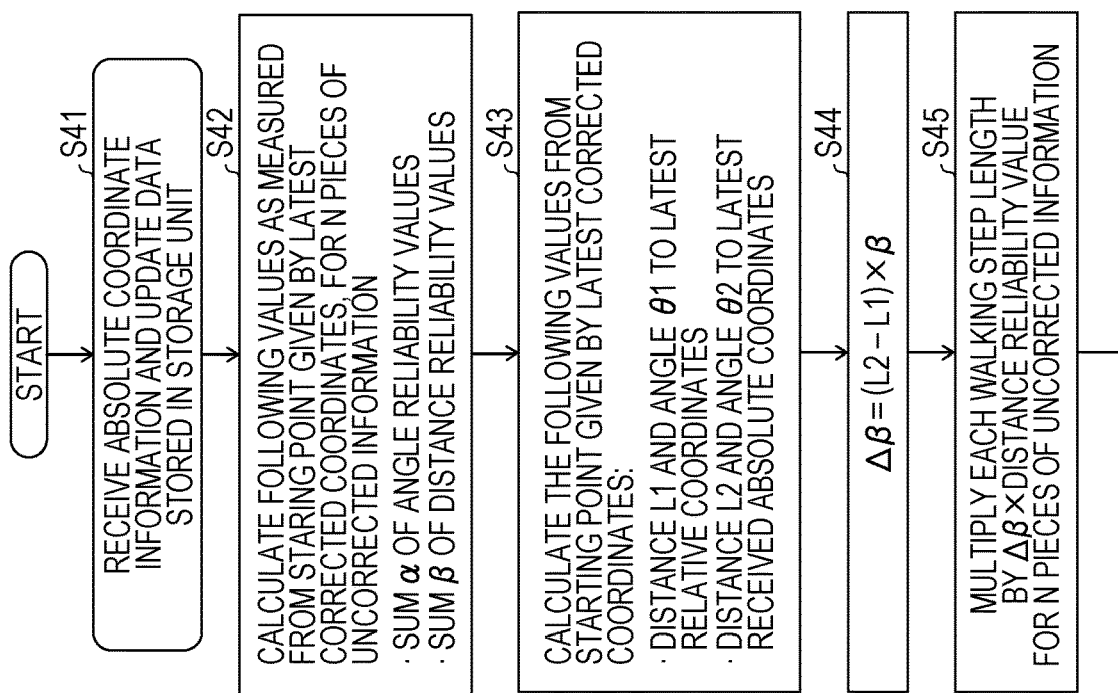
FIG. 16 is a flow chart illustrating a flow of a process of calculating a correction amount of a position measurement apparatus.

FIG. 16 is a flow chart illustrating a flow of a process performed by the correction processing unit 13.

Step S41

The correction processing unit 13 receives information associated with absolute coordinates indicating the position of the position measurement apparatus 1 from the absolute coordinate measurement unit 12. The correction processing unit 13 updates the information associated with the absolute coordinates stored in the storage unit 131.

Step S42

The correction processing unit 13 extracts N pieces of uncorrected position information stored in the position information storage unit 1311 based on the correction completion flags stored in the correction completion flag storage unit 1314 in the storage unit 131, and the correction processing unit 13 calculates the total sum α of the reliability values of the angle and the total sum β of the reliability values of the distance. The total sum α of the reliability values of the angle is calculated according to equation (7) described above, and the total sum β of the reliability values of the distance is calculated according to equation (3) described above.

Step S43

The correction processing unit 13 calculates, using a function of the trajectory correction calculation unit 133, the distance L1 and the angle θ1 as seen from the latest already-corrected position information to the latest relative coordinates calculated by the relative coordinate calculation unit 116. The distance L1 is calculated according to equation (2) described above, and the angle θ1 is calculated according to equation (6) described above. The correction processing unit 13 calculates, using a function of the trajectory correction calculation unit 133, the distance L2 and the angle θ2 from the latest already-corrected position information to the absolute coordinates indicating the position of the position measurement apparatus 1 received in step S41. The distance L2 is calculated according to equation (1) described above, and the angle θ2 is calculated according to equation (5) described above.

The process from step S41 to step S43 is performed by the trajectory correction calculation unit 133 as a preliminary process for the correction.

Step S44

The correction processing unit 13 calculates the distance correction coefficient Δβ using a function of the trajectory correction calculation unit 133. Δβ may be calculated such that Δβ=(L2−L1)×β. In the process in step S44, equation (4) described above is used.

Step S45

Using a function of the trajectory correction calculation unit 133, the correction processing unit 13 multiples the distance of every walking step by the reliability value of the distance for the N pieces of the uncorrected position information. In step S45, equations (9) to (12) described above are used.

The above-described process in steps S44 and S45 is performed by the trajectory correction calculation unit 133 as a first-stage process of the distance correction, and the correction amount is obtained by multiplying $\Delta\beta$ calculated in step S44 by the reliability value of the distance. Thus, the corrected coordinates are given as $(x'_{pi}, y'_{pi})$.

The distance moved every walking step is equal to the length of stride, and the length of stride from an ith step to an (i+1)th step can be determined according to equation (23) shown below.

$$\text{Length of stride} = \sqrt{((X_{i+1}-X_i)^2+(Y_{i+1}-Y_i)^2)} \quad (23)$$

Step S46

The correction processing unit 13 calculates the angle correction coefficient $\Delta\alpha$ using a function of the trajectory correction calculation unit 133. More specifically, using the angle $\theta1$ and the angle $\theta2$ obtained in step S43, $\Delta\alpha$ can be calculated as $\Delta\alpha=(\theta2-\theta1)\times\alpha$. In the process step S46, equation (8) described above is used.

Step S47 the trajectory correction calculation unit 133 determines whether $\theta1-\theta2\approx0$. In a case where the trajectory correction calculation unit 133 determines that $\theta1-\theta2\approx0$ (Yes in step S47), the trajectory correction calculation unit 133 performs the process according to equations (14) to (16) described above thereby obtaining corrected coordinates $(x''_{pi}, y''_{pi})$. Thereafter, the processing flow proceeds to step S50. However, in a case where the determination by the trajectory correction calculation unit 133 denies that $\theta1-\theta2\approx0$ (No in step S47), the processing flow proceeds to step S48.

Step S48

The trajectory correction calculation unit 133 corrects the movement direction every walking step for each of the N pieces of uncorrected position information such that $\Delta\alpha\times$angle reliability value is employed as the angle correction amount, and the movement direction in every walking step is rotated by the angle correction amount.

The movement direction in the ith step to the (i+1)th step can be determined according to equation (24) shown below.

$$\text{Movement direction} = \tan^{-1}((X_{i+1}-X_i)/(Y_{i+1}-Y_i)) \quad (24)$$

Step S49

The trajectory correction calculation unit 133 performs a recalculation of the angle $\theta1$ on the latest already-corrected relative coordinates and updates the value of $\Delta\alpha$ according to the value of $\theta1-\theta2$. Thereafter, the processing flow returns to step S47. In the recalculation of the angle $\theta1$, equation (13) described above is used. More specifically, the trajectory correction calculation unit 133 updates the value of $\Delta\alpha$ according to the value of $\theta1-\theta2$ using a known method such as the Newton's method or the like.

The above-described process in steps S46 to S49 is performed by the trajectory correction calculation unit 133 as the angle correction process and the angle correction amount is determined such that $\theta1-\theta2\approx0$.

Step S50

The trajectory correction calculation unit 133 performs a recalculation of the distance L1 on the latest already-corrected relative coordinates. In the calculation of the distance L1, equation (17) described above is used.

Step S51

The trajectory correction calculation unit 133 calculates the distance correction factor $\gamma$ for the recalculated distance L1. $\gamma$ can be calculated as $\gamma=L2/L1$. That is, the process in step S51 is performed according to equation (18) described above.

Step S52

The trajectory correction calculation unit 133 multiplies the distance in each walking step by $\gamma$ for the N pieces of uncorrected position information according to equations (19) to (22). Thus, the correction process is completed and the corrected coordinates are given as $(x'''_{pi}, y'''_{pi})$.

The above-described process in steps S50 to S52 by the trajectory correction calculation unit 133 is performed as a second-stage process of the distance correction.

In the example described above, the correction in terms of the movement distance and the movement direction by the correction processing unit 13 is performed on the N pieces of uncorrected position information for every walking step. However, in stead of performing the correction every walking step, the correction may be performed every predetermined number of walking steps.

Second Embodiment

A second embodiment of the present disclosure is described below. For convenience of illustration, elements or units having similar functions to those described in the first embodiment are denoted by similar reference numerals, and a description thereof is omitted.

In the position measurement apparatus 1 according to the second embodiment, an amount of change of a magnitude of a resultant vector of vectors along three axes of the geomagnetic sensor 1112 is added as one of factors based on which the angle reliability value is calculated by the angle reliability generation unit 1151 shown in FIG. 1.

The movement direction calculation unit 113 in the movement information generation unit 118 generates information associated with the movement direction of the position measurement apparatus 1 from the resultant vector of vectors along three axes based on the sensor values of the geomagnetic sensor 1112. When a magnetic field exists near the geomagnetic sensor 1112, the geomagnetic sensor 1112 detects this magnetic field, and the magnitude of the resultant vector of vectors along three axes may be disturbed by the magnetic field. The angle reliability generation unit 1151 generates the reliability value of the angle by calculating the amount of change of the information associated with the movement direction obtained from the magnitude of the resultant vector of vectors along three axes based on the sensor values of the geomagnetic sensor 1112. More specifically, the angle reliability generation unit 1151 determines that the smaller the amount of change of the magnitude of the resultant vector of vectors along three axes based on the sensor values of the geomagnetic sensor 1112, the smaller the error is. The angle reliability generation unit 1151 employs, as the reliability value, the value whose numerator is 1 and whose denominator is given by the sum of amounts of change of the resultant vector of vectors along three axes of the geomagnetic sensor 1112 each of which is detected every walking step. Note that the position measurement apparatus 1 according to the second embodiment performs the same process as that performed according to the first embodiment except that the amount of change of the magnitude of the resultant vector of vectors along three axes of the geomagnetic sensor 1112 is added as one of factors based on which the angle reliability value is calculated by the angle reliability generation unit 1151.

Third Embodiment

A third embodiment of the present disclosure is described below. For convenience of illustration, elements or units having similar functions to those described in the first embodiment are denoted by similar reference numerals, and a description thereof is omitted.

In the position measurement apparatus 1 according to the third embodiment, the amount of change of the magnetic inclination indicated by the geomagnetic sensor 1112 is added as one of factors based on which the angle reliability value is calculated by the angle reliability generation unit 1151 shown in FIG. 1. The movement direction calculation unit 113 in the movement information generation unit 118 generates information associated with the movement direction from the magnetic inclination of the position measurement apparatus 1 based on the sensor values of the geomagnetic sensor 1112.

When a nonmagnetic material exists near the geomagnetic sensor 1112, distortion occurs in the direction of the magnetism, and thus the direction indicated by the geomagnetic sensor 1112 may be different from the magnetic north direction. This result in a possibility that an error occurs in the magnetic inclination, which changes depending on latitude and longitude but does not significantly change during a movement of about several hundred meters in an ordinal circumstance. In view of the above, the angle reliability generation unit 1151 generates the reliability value of the angle by calculating the amount of change of the information associated with the movement direction obtained from the magnetic inclination of the position measurement apparatus 1 based on the sensor values of the geomagnetic sensor 1112.

More specifically, the angle reliability generation unit 1151 determines that the smaller the amount of change of the magnetic inclination indicated by the geomagnetic sensor 1112, the smaller the error is. The angle reliability generation unit 1151 employs, as the reliability value, the value whose numerator is 1 and whose denominator is given by the sum of amount of changes of the magnetic inclinations of the geomagnetic sensor 1112 detected on a step-by-step basis during walking. Note that the position measurement apparatus 1 according to the third embodiment performs the same process as that performed according to the first embodiment except that the amount of change of the magnetic inclination indicated by the geomagnetic sensor 1112 is added as one of factors based on which the angle reliability value is calculated by the angle reliability generation unit 1151.

Fourth Embodiment

A fourth embodiment of the present disclosure is described below. For convenience of illustration, elements or units having similar functions to those described in the first embodiment are denoted by similar reference numerals, and a description thereof is omitted.

In the position measurement apparatus 1 according to the fourth embodiment, the amounts of changes of the derivatives of the sensor values of the gyro sensor 1113 are added as one of factors based on which the angle reliability value is calculated by the angle reliability generation unit 1151 shown in FIG. 1. The movement information generation unit 118 generates the information associated with the movement direction from the derivatives of the sensor values of the gyro sensor 1113.

Figure 20A:
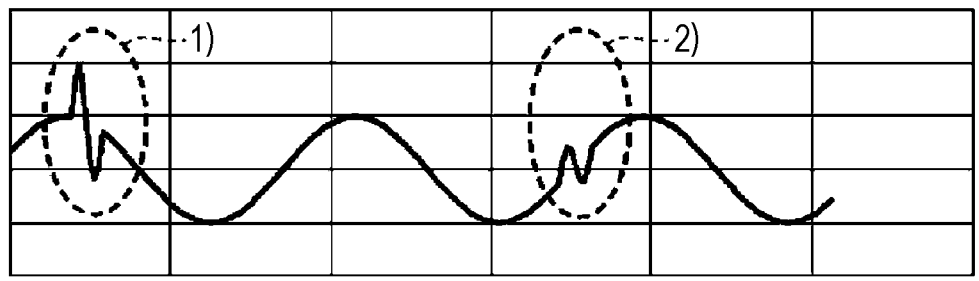
FIGS. 20A, 20B, and 20C are diagrams illustrating an example of a behavior of a gyro sensor in walking according to a sixth embodiment of the present disclosure.
Figure 20B:
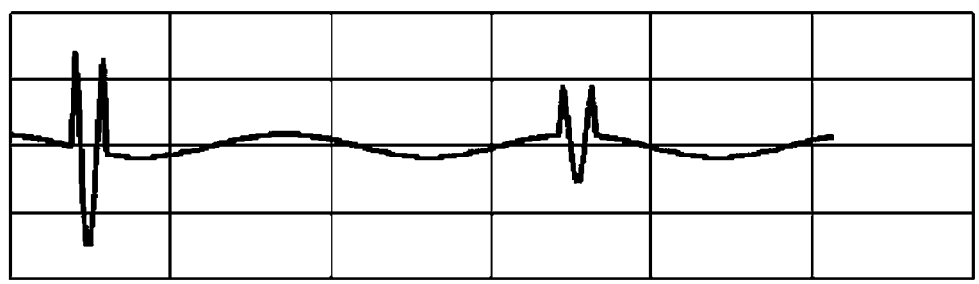
Figure 20C:
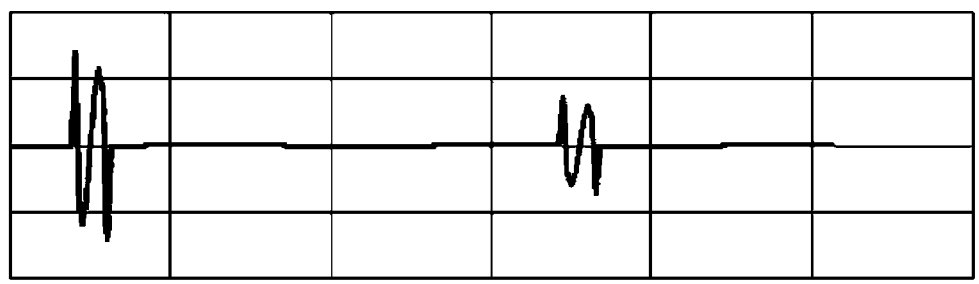

When a human being walks, he/she moves alternately right and left legs, which causes a turning motion from side to side to occur during walking. As shown in FIGS. 20A to 20C, if an impact such as an unusual sudden motion of a body occurs as in an area 1) or an area 2) shown in FIG. 20A in the middle of an ideal regular motion of a waist, a change occurs in an amount of change of a sensor value of the gyro sensor 1113 or the gyro sensor 1113 as shown in FIG. 20B or 20C.

Such a change in a sensor value of the gyro sensor 1113 or a change in an amount of change of a sensor value of the gyro sensor 1113 can cause a reduction in the accuracy of the position measurement. A change caused by a sudden impact can result in a greater change in an amount of change of a sensor value of the gyro sensor 1113 than in the sensor value of the gyro sensor 1113. Therefore, in the present embodiment, an amount of change of a gyro sensor value is used as a factor based on which the angle reliability value is calculated by the angle reliability generation unit 1151.

The angle reliability generation unit 1151 determines the derivatives of the sensor values in the respective directions along the three axes of the gyro sensor 1113, and generates the reliability value of the angle by calculating the amount of change of the information associated with the movement direction obtained from the derivatives. More specifically, the angle reliability generation unit 1151 determines that the smaller the amount of changes of the sensor values of the gyro sensor 1113, the smaller the error is. The angle reliability generation unit 1151 employs, as the reliability value, the value whose numerator is 1 and whose denominator is given by the sum of absolute values of amount of changes of the sensor values of the gyro sensor 1113 detected on a step-by-step basis during walking. Note that the position measurement apparatus 1 according to the fourth embodiment performs the same process as that performed according to the first embodiment except that the amount of change of the sensor value of the gyro sensor 1113 is added as one of factors based on which the angle reliability value is calculated by the angle reliability generation unit 1151.

Fifth Embodiment

A fifth embodiment of the present disclosure is described below. For convenience of illustration, elements or units having similar functions to those described in the first embodiment are denoted by similar reference numerals, and a description thereof is omitted.

In the position measurement apparatus 1 according to the fifth embodiment, the difference between the angle of the attitude calculated from the sensor value of the acceleration sensor 1111 and that calculated from the sensor value of the geomagnetic sensor 1112 is added as one of factors based on which the angle reliability value is calculated by the angle reliability generation unit 1151. When only the gravitational acceleration component is considered, the rotation angle about the coordinate axis perpendicular to the vertical direction can be determined from the sensor value of the acceleration sensor 1111. The rotation angle about the coordinate axis perpendicular to the vertical direction corresponds to a pitch angle or a roll angle in the airplane control or the like. The pitch angle or the roll angle can also be determined from the sensor values of the geomagnetic sensor 1112.

The attitude information generation unit 112 determines the rotation angle about the coordinate axis perpendicular to the vertical direction based on the sensor value of the acceleration sensor 1111 and also the rotation angle based on the sensor value of the geomagnetic sensor 1112, and generates the attitude information using the determined rotation angles.

The angle reliability generation unit 1151 generates the reliability value of the angle based on the difference between the angle associated with the attitude information based on the sensor value of the acceleration sensor 1111 and the angle associated with the attitude information based on the sensor value of the geomagnetic sensor 1112. More specifically, the angle reliability generation unit 1151 determines that the smaller the difference between the angle of the attitude based on the sensor value of the acceleration sensor 1111 and the angle of the attitude based on the sensor value of the geomagnetic sensor 1112, the smaller the error is. The angle reliability generation unit 1151 employs, as the reliability value, the value whose numerator is 1 and whose denominator is given by the sum of absolute values of differences between the absolute value of the difference of the pitch angle and the absolute value of the roll angle detected for every walking step. Note that the position measurement apparatus 1 according to the fifth embodiment performs the same process as that performed according to the first embodiment except that the difference between the angle of the attitude calculated from the sensor value of the acceleration sensor 1111 and the angle of the attitude calculated from the sensor value of the geomagnetic sensor 1112 is added as one of factors based on which the angle reliability value is calculated by the angle reliability generation unit 1151.

Sixth Embodiment

A sixth embodiment of the present disclosure is described below. For convenience of illustration, elements or units having similar functions to those described in the first embodiment are denoted by similar reference numerals, and a description thereof is omitted.

In the position measurement apparatus 1 according to the sixth embodiment, the difference of the amount of change of the velocity obtained by dividing the movement distance determined from the sensor value of the acceleration sensor 1111 by the time taken by the user to walk every predetermined number of steps (for example, one step) is added as one of factors based on which the distance reliability value is calculated by the distance reliability generation unit 1152 shown in FIG. 1.

The movement distance calculation unit 114 of the movement information generation unit 118 generates the information associated with the movement distance from the amount of change of the velocity obtained by dividing the sensor value of the acceleration sensor 1111 by the moving time taken by the user to walk every predetermined number of steps.

In a circumstance in which no change occurs in conditions of the ground such as a slant and/or the like, human beings walk at a substantially constant walking speed. Therefore, the distance reliability generation unit 1152 determines that the smaller the difference of the walking speed detected every step from the average speed is, the smaller the error is. The distance reliability generation unit 1152 generates the reliability value of the distance based on the difference, from the average moving time of the user, of the information associated with the movement distance obtained from the amount of change of the velocity determined by dividing the sensor value of the acceleration sensor 1111 by the moving time taken by the user to walk every predetermined number of steps. For example, the distance reliability generation unit 1152 employs, as the reliability value, the value whose numerator is 1 and whose denominator is given by the difference of the velocity of the user in walking every predetermined number of steps from the average velocity of the moving time of the user. Note that the position measurement apparatus 1 according to the sixth embodiment performs the same process as that performed according to the first embodiment except that the difference of the amount of change of the velocity determined by dividing the movement distance calculated from the sensor value of the acceleration sensor 1111 by the time taken to walk one step is added as one of factors based on which the distance reliability value is calculated by the distance reliability generation unit 1152.

Modifications

The position measurement apparatus 1 may be realized by combining constituent elements used in the first to sixth embodiments described above. More specifically, as one of factors based on which the angle reliability value is calculated by the angle reliability generation unit 1151 of the position measurement apparatus 1 according to the first embodiment, at least one of the following values may be added: the amount of change of the magnitude of the resultant vector of vectors along three axes of the geomagnetic sensor 1112; the amount of change of the magnetic inclination indicated by the geomagnetic sensor 1112; the amount of change of the derivative of the sensor value of the gyro sensor 1113; and the difference between the angle of the attitude calculated from the sensor value of the acceleration sensor 1111 and the angle of the attitude calculated from the sensor value of the geomagnetic sensor 1112. As one of factors based on which the distance reliability value is calculated by the distance reliability generation unit 1152 of the position measurement apparatus 1 according to the first embodiment, the following value may be added, that is, the difference of the amount of change of the velocity obtained by dividing the movement distance determined from the sensor value of the acceleration sensor 1111 by the time taken by the user to walk every predetermined number of steps (for example, every one step). That is, the sensor group 111 of the position measurement apparatus 1 includes at least one of the following sensors: the gyro sensor 1113; the geomagnetic sensor 1112; the acceleration sensor 1111, and the atmospheric pressure sensor 1114.

The reliability generation unit 115 performs a combination including a plurality of the following processes: the process of generating the reliability value of the angle from the ratio of the first principal component to the second principal component of the information associated with the movement direction; the process of generating a reliability value of the angle by calculating the difference between information associated with the movement direction obtained by integrating the value acquired from the gyro sensor 1113 and the information associated with the movement direction acquired from the geomagnetic sensor 1112; the process of generating the reliability value of the angle by calculating the amount of change of the information associated with the movement direction obtained from the magnitude of the resultant vector of vectors along three axes of the geomagnetic sensor 1112; the process of generating the reliability value of the angle by calculating the amount of change of the information associated with the movement direction obtained from the magnetic inclination of the geomagnetic sensor 1112; the process of generating the reliability value of the angle by calculating the amount of change of the information associated with the movement direction obtained from the derivatives along the three axes of the gyro sensor 1113; the process of generating the reliability value of the angle from the difference between the angle associated with the attitude information based on the sensor value of the acceleration sensor 1111 and the angle associated with the attitude information based on the sensor value of the geomagnetic sensor 1112; the process of generating the reliability value of the distance from the difference between the movement distance obtained from the amount of change of the atmospheric pressure sensor 1114 and the movement distance obtained from the amount of change of the acceleration sensor 1111; and the process of generating the reliability value of the distance from the difference, from the average velocity of the moving time of the user, of the information associated with the movement distance obtained from the amount of change of the velocity determined by dividing the value of the acceleration sensor 1111 by the moving time taken by the user to walk every predetermined number of steps.

Examples of Implementations Using Software

The control blocks of the position measurement apparatus 1 (in particular, the attitude information generation unit 112, the reliability generation unit 115, and the trajectory correction calculation unit 133) may be realized using a logic circuit (hardware) formed on an integrated circuit (an IC chip) or may be realized by software.

In the latter case, the position measurement apparatus 1 includes a computer configured to execute an instruction of a program which is software for realizing each function. The computer includes at least one processor (a control apparatus) and also at least one computer-readable storage medium in which the program is stored. In the computer, the processor reads out the program from the storage medium and executes it thereby achieving the function according to the present disclosure. A for the process, for example, a CPU (Central Processing Unit) may be used. As for the storage medium, a non-transitory tangible medium such as a ROM (Read Only Memory), a tape, a disk, a card, a semiconductor memory, a programmable logic circuit, or the like may be used. The computer may further include a RAM (Random Access Memory) or the like in which the program is loaded. The program may be supplied to the computer via any transmission medium (a communication network, a broadcast wave, or the like) capable of transmitting the program. In an aspect, the present disclosure may be implemented in the form of a data signal embedded in a carrier wave such that the program is embodied by electric transmission of the program.

Summary of Embodiments

In Aspect 1 of the present disclosure, a position measurement apparatus (1) includes a position estimation unit (11) configured to estimate a position of a device of interest based on a sensor value acquired from a sensor, an absolute coordinate measurement unit (12) configured to measure absolute coordinates of the device of interest; and, a correction processing unit (13) configured to correct the position of the device of interest estimated by the position estimation unit (11) based on the absolute coordinates of the device of interest measured by the absolute coordinate measurement unit (12), the position estimation unit (11) including an attitude information generation unit (112) configured to generate attitude information associated with the device of interest based on the sensor value, a movement information generation unit (118) configured to generate, based on the attitude information, movement information including a movement distance of the device of interest and a movement direction of the device of interest, and a reliability generation unit (115) configured to generate, based on the sensor value, reliability information indicating a reliability value of the movement information, the correction processing unit (13) being configured to determine an amount of distance correction to be made every predetermined number of steps and an amount of angle correction to be made every predetermined number of steps based on the reliability information and the movement information, and correct the movement distance and the angle every predetermine number of steps starting from latest already-corrected position information associated with the device of interest.

The configuration described above makes it possible to achieve high accuracy in the trajectory by correcting the distance and the angle every predetermined number of walking steps even in a state in which the frequency of acquiring absolute coordinates is reduced.

In the position measurement apparatus (1) according to Aspect 2 of the present disclosure, based on Aspect 1, the movement information generation unit (118) may generate information associated with the movement direction by performing a principal component analysis on a horizontal acceleration included in the attitude information, and the reliability generation unit (115) may generate a reliability value of an angle from a ratio of a first principal component to a second principal component included in the information associated with the movement direction.

In the position measurement apparatus (1) according to Aspect 3 of the present disclosure, based on Aspect 1, the sensor may include a gyro sensor (1113) and a geomagnetic sensor (1112), the movement information generation unit (118) may generate the information associated with the movement direction by integrating a value acquired from the gyro sensor (1113), and the reliability generation unit (115) may generate a reliability value of an angle by calculating a difference between the information associated with the movement direction obtained by integrating the value obtained from the gyro sensor (1113) and information associated with the movement direction acquired from the geomagnetic sensor (1112).

In the position measurement apparatus (1) according to Aspect 4 of the present disclosure, based on Aspect 1, the sensor may include a geomagnetism sensor (1112), the movement information generation unit (118) may generate the information associated with the movement direction from a resultant vector of vectors along three axes obtained from the geomagnetic sensor (1112), and the reliability generation unit (115) may generate a reliability value of an angle by calculating an amount of change of the information associated with the movement direction obtained from a magnitude of the resultant vector of vectors along three axes obtained from the geomagnetic sensor (1112).

In the position measurement apparatus (1) according to Aspect 5 of the present disclosure, based on Aspect 1, the sensor may include a geomagnetism sensor (1112), the movement information generation unit (118) may generate the information associated with the movement direction from a magnetic inclination of the geomagnetic sensor (1112), and the reliability generation unit (115) may generate a reliability value of an angle by calculating an amount of change of the information associated with the movement direction obtained from the magnetic inclination of the geomagnetic sensor (1112).

In the position measurement apparatus (1) according to Aspect 6 of the present disclosure, based on Aspect 1, the sensor may include a gyro sensor (1113), the movement information generation unit (118) may generate the information associated with the movement direction by differentiating a value acquired from the gyro sensor (1113), and the reliability generation unit (115) may generate a reliability value of an angle by calculating an amount of change of the information associated with the movement direction obtained from derivatives along the three axes of the gyro sensor (1113).

In the position measurement apparatus (1) according to Aspect 7 of the present disclosure, based on Aspect 1, the sensor may include an acceleration sensor (1111) and a geomagnetic sensor (1112), the attitude information generation unit (112) may generate attitude information corresponding to a sensor value of the acceleration sensor (1111) and a sensor value of the geomagnetic sensor (1112), and the reliability generation unit (115) may generate a reliability value of an angle from a difference in angle between the attitude information corresponding to the sensor value of the acceleration sensor (1111) and the attitude information corresponding to the sensor value of the geomagnetic sensor (1112).

In the position measurement apparatus (1) according to Aspect 8 of the present disclosure, based on Aspect 1, the sensor may include an acceleration sensor (1111), a geomagnetic sensor (1112), and a gyro sensor (1113), the attitude information generation unit (112) may generate attitude information by using a combination of the acceleration sensor (1111) and the geomagnetic sensor (1112), and the gyro sensor (1113), and the reliability generation unit (115) may generate a reliability value of an angle from a difference in azimuth angle between the attitude information obtained by the gyro sensor (1113) and the attitude information obtained by the combination of the acceleration sensor (1111) and the geomagnetic sensor (1112).

In the position measurement apparatus (1) according to Aspect 9 of the present disclosure, based on Aspect 1, the sensor may include an acceleration sensor (1111) and an atmospheric pressure sensor (1114), the movement information generation unit (118) may generate information associated with the movement distance from an amount of change of a sensor value of the atmospheric pressure sensor (1114) and may generate information associated with the movement distance from an amount of change in the vertical direction of a sensor value of the acceleration sensor (1111), and the reliability generation unit may generate a reliability value of the distance from a difference between the distance obtained by the atmospheric pressure sensor (1114) and the distance obtained by the acceleration sensor (1111).

In the position measurement apparatus (1) according to Aspect 10 of the present disclosure, based on Aspect 1, the sensor may include an acceleration sensor (1111), the movement information generation unit (118) may generate the information associated with the movement distance from an amount of change of a velocity obtained by dividing a value of the acceleration sensor (1111) by a moving time taken for the user to move a predetermined number of steps, and the reliability generation unit (115) may generate the reliability value of the distance from a difference, from an average moving time of the user, of information associated with the movement distance obtained from an amount of change of a velocity obtained by dividing a value of the acceleration sensor (1111) by a moving time taken for the user to move a predetermined number of walking steps.

In the position measurement apparatus (1) according to Aspect 12 of the present disclosure, based on one of Aspects 1 to 11, the absolute coordinate measurement unit (12) may measure the absolute coordinates by acquiring a GPS signal.

In the position measurement apparatus (1) according to Aspect 13 of the present disclosure, based on one of Aspects 1 to 11, the absolute coordinate measurement unit (12) may measure the absolute coordinates by receiving a beacon radio wave.

In the position measurement apparatus (1) according to Aspect 14 of the present disclosure, based on one of Aspects 1 to 11, the absolute coordinate measurement unit (12) may measure the absolute coordinates by receiving a Wi-Fi radio wave.

In the position measurement apparatus (1) according to Aspect 15 of the present disclosure, based on one of Aspects 1 to 11, the absolute coordinate measurement unit (12) may measure the absolute coordinates by acquiring an image marker.

The position measurement apparatus 1 according to any one of Aspects of the present disclosure may be realized by a computer. In this case, a control program controls the computer so as to operate as units (software elements) included in the position measurement apparatus 1 thereby realizing the position measurement apparatus 1 on the computer. The control program configured to control the computer so as to realize the position measurement apparatus 1, and a computer-readable storage medium in which the control program is stored fall into the scope of the present disclosure.

The present disclosure is not limited to the embodiments described above, but various modifications are possible within the scope described in claims. Embodiments may also be possible by properly combining technical means disclosed in different embodiments, and the resultant embodiments fall within the technical scope of the present disclosure. Furthermore, by combining technical means disclosed in embodiments, it is possible to create a new technical feature.

The present disclosure contains subject matter related to that disclosed in Japanese Priority Patent Application JP 2018-033658 filed in the Japan Patent Office on Feb. 27, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A position measurement apparatus comprising:
a controller including an integrated circuit, or a controller including a storage medium that stores a program and a processor that reads out the program from the storage medium and executing the program, wherein
the integrated circuit or the processor functions as:
a position estimation unit that estimates a position of a device of interest based on a sensor value acquired from a sensor;
an absolute coordinate measurement unit that measures absolute coordinates of the device of interest; and
a correction processing unit that corrects the position of the device of interest estimated by the position estimation unit based on the absolute coordinates of the device of interest measured by the absolute coordinate measurement unit,
the position estimation unit including
an attitude information generation unit that determines a rotation angle around a coordinate axis perpendicular to a vertical direction based on the sensor value, and thereby, generates attitude information associated with the device of interest based on the sensor value,
a movement information generation unit that generates, based on the attitude information, movement infor- mation including a movement distance of the device of interest and a movement direction of the device of interest, and a reliability generation unit that generates, based on the sensor value, reliability information indicating a reliability value of the movement information, the correction processing unit determines an amount of distance correction to be made every predetermined number of steps and an amount of angle correction to be made every predetermined number of steps based on the reliability information and the movement information, and corrects the movement distance and the movement direction every predetermine number of steps starting from latest already-corrected position information associated with the device of interest.

2. The position measurement apparatus according to claim 1, wherein the movement information generation unit generates information associated with the movement direction by performing a principal component analysis on a horizontal acceleration included in the attitude information, and the reliability generation unit generates a reliability value of an angle from a ratio of a first principal component to a second principal component included in the information associated with the movement direction.

3. The position measurement apparatus according to claim 1, wherein the sensor includes a gyro sensor and a geomagnetic sensor, the movement information generation unit generates the information associated with the movement direction by integrating a value acquired from the gyro sensor, and the reliability generation unit generates a reliability value of an angle by calculating a difference between the information associated with the movement direction obtained by integrating the value obtained from the gyro sensor and information associated with the movement direction acquired from the geomagnetic sensor.

4. The position measurement apparatus according to claim 1, wherein the sensor includes a geomagnetism sensor, the movement information generation unit generates the information associated with the movement direction from a resultant vector of vectors along three axes obtained from the geomagnetic sensor, and the reliability generation unit generates a reliability value of an angle by calculating an amount of change of the information associated with the movement direction obtained from a magnitude of the resultant vector of vectors along three axes obtained from the geomagnetic sensor.

5. The position measurement apparatus according to claim 1, wherein the sensor includes a geomagnetism sensor, the movement information generation unit generates the information associated with the movement direction from a magnetic inclination of the geomagnetic sensor, and the reliability generation unit generates a reliability value of an angle by calculating an amount of change of the information associated with the movement direction obtained from the magnetic inclination of the geomagnetic sensor.

6. The position measurement apparatus according to claim 1, wherein the sensor includes a gyro sensor, the movement information generation unit generates the information associated with the movement direction by differentiating a value acquired from the gyro sensor, and the reliability generation unit generates a reliability value of an angle by calculating an amount of change of the information associated with the movement direction obtained from derivatives along the three axes of the gyro sensor.

7. The position measurement apparatus according to claim 1, wherein the sensor includes an acceleration sensor and a geomagnetic sensor, the attitude information generation unit generates attitude information corresponding to a sensor value of the acceleration sensor and a sensor value of the geomagnetic sensor, and the reliability generation unit generates a reliability value of an angle from a difference in angle between the attitude information corresponding to the sensor value of the acceleration sensor and the attitude information corresponding to the sensor value of the geomagnetic sensor.

8. The position measurement apparatus according to claim 1, wherein the sensor includes an acceleration sensor, a geomagnetic sensor, and a gyro sensor, the attitude information generation unit generates attitude information by using a combination of the acceleration sensor and the geomagnetic sensor, and the gyro sensor, and the reliability generation unit generates a reliability value of an angle from a difference in azimuth angle between the attitude information obtained by the gyro sensor and the attitude information obtained by the combination of the acceleration sensor and the geomagnetic sensor.

9. The position measurement apparatus according to claim 1, wherein the sensor includes an acceleration sensor and an atmospheric pressure sensor, the movement information generation unit generates information associated with the movement distance from an amount of change of a sensor value obtained from the atmospheric pressure sensor and generates information associated with the movement distance from an amount of change in a vertical direction of a sensor value obtained from the acceleration sensor, and the reliability generation unit generates a reliability value of the distance from a difference between the distance obtained by the atmospheric pressure sensor and the distance obtained by the acceleration sensor.

10. The position measurement apparatus according to claim 1, wherein the sensor includes an acceleration sensor, the movement information generation unit generates the information associated with the movement distance from an amount of change of a velocity obtained by dividing a value of the acceleration sensor by a moving time taken for the user to move a predetermined number of steps, and the reliability generation unit generates the reliability value of the distance from a difference, from an average moving time of the user, of information associated with the movement distance obtained from an amount of change of a velocity obtained by dividing a value of the acceleration sensor by a moving time taken for the user to move a predetermined number of walking steps.

11. The position measurement apparatus according to claim 1, wherein the sensor includes at least one of a gyro sensor, a geomagnetic sensor, and acceleration sensor, and an atmospheric pressure sensor, the reliability generation unit performs a combination of plurality of processes selected from a group including a process of generating a reliability value of an angle from a ratio of a first principal component of information associated with the movement direction to a second principal component of the information associated with the movement direction, a process of generating a reliability value of an angle by calculating a difference between information associated with the movement direction obtained by integrating a value acquired from the gyro sensor and information associated with the movement direction acquired from the geomagnetic sensor, a process of generating a reliability value of an angle by calculating an amount of change of information associated with the movement direction obtained from a magnitude of a resultant vector of vectors along three axes of the geomagnetic sensor, a process of generating a reliability value of an angle by calculating an amount of change of information associated with the movement direction obtained from a magnetic inclination of the geomagnetic sensor, a process of generating a reliability value of an angle by calculating an amount of change of information associated with the movement direction obtained from derivatives along three axes of the gyro sensor, a process of generating a reliability value of an angle from a difference in angle between attitude information corresponding to a sensor value of the acceleration sensor and attitude information corresponding to a sensor value of the geomagnetic sensor, a process of generating a reliability value of a distance from a difference between a movement distance obtained from an amount of change of the atmospheric pressure sensor and a movement distance obtained from an amount of change of the acceleration sensor, and a process of generating a reliability value of a distance from a difference between an average moving time of a user and information associated with the movement distance obtained from an amount of change of a velocity obtained by dividing a value of the acceleration sensor by a moving time taken for the user to move a predetermined number of steps.

12. The position measurement apparatus according to claim 1, wherein the absolute coordinate measurement unit measures the absolute coordinates by acquiring a GPS signal.

13. The position measurement apparatus according to claim 1, wherein the absolute coordinate measurement unit measures the absolute coordinates by receiving a beacon radio wave.

14. The position measurement apparatus according to claim 1, wherein the absolute coordinate measurement unit measures the absolute coordinates by receiving a Wi-Fi radio wave.

15. The position measurement apparatus according to claim 1, wherein the absolute coordinate measurement unit measures the absolute coordinates by acquiring an image marker.

16. A position correction method comprising:

estimating a position of a device of interest based on a sensor value acquired by a sensor;

measuring absolute coordinates of the device of interest; and correcting the estimated position of the device of interest based on the absolute coordinates of the device of interest, the estimating of the position including determining a rotation angle around a coordinate axis perpendicular to a vertical direction based on the sensor value, and thereby, generating attitude information associated with the device of interest based on the sensor value, generating movement information including a movement distance of the device of interest and a movement direction of the device of interest based on the attitude information, and generating reliability information indicating a reliability value of the movement information based on the sensor value, the correcting including determining an amount of distance correction to be made every predetermined number of steps and an amount of angle correction to be made every predetermined number of steps based on the reliability information and the movement information, and correcting the movement distance and the movement direction every predetermine number of steps starting from latest already-corrected position information associated with the device of interest.

17. A position information acquisition system comprising:

the position measurement apparatus according to claim 1; and an installed terminal having installation coordinate information, wherein the position measurement apparatus acquires the absolute coordinates by acquiring the installation coordinate information from the installed terminal.

* * * * *